(12) United States Patent
Talarico et al.

(10) Patent No.: US 11,564,249 B2
(45) Date of Patent: Jan. 24, 2023

(54) CONFIGURED GRANT UPLINK (UL) TRANSMISSION IN NEW RADIO UNLICENSED (NR-U)

(71) Applicant: APPLE INC., Cupertino, CA (US)

(72) Inventors: Salvatore Talarico, Sunnyvale, CA (US); Jeon Jeongho, San Jose, CA (US); Gang Xiong, Portland, OR (US); Hwan-Joon Kwon, Portland, OR (US)

(73) Assignee: APPLE INC., Cupertino, CA (US)

( * ) Notice: Subject to any disclaimer, the term of this patent is extended or adjusted under 35 U.S.C. 154(b) by 126 days.

(21) Appl. No.: 16/408,337

(22) Filed: May 9, 2019

(65) Prior Publication Data

US 2019/0268935 A1    Aug. 29, 2019

Related U.S. Application Data

(60) Provisional application No. 62/669,842, filed on May 10, 2018.

(51) Int. Cl.
| | | |
|---|---|---|
| *H04W 72/14* | (2009.01) | |
| *H04W 72/12* | (2009.01) | |
| *H04L 1/18* | (2006.01) | |
| *H04W 16/14* | (2009.01) | |
| *H04W 28/04* | (2009.01) | |
| *H04L 1/00* | (2006.01) | |
| *H04W 72/04* | (2009.01) | |

(52) U.S. Cl.
CPC .............. *H04W 72/14* (2013.01); *H04L 1/00* (2013.01); *H04L 1/1816* (2013.01); *H04W 16/14* (2013.01); *H04W 28/04* (2013.01); *H04W 72/042* (2013.01); *H04W 72/044* (2013.01); *H04W 72/1268* (2013.01)

(58) Field of Classification Search
None
See application file for complete search history.

(56) References Cited

U.S. PATENT DOCUMENTS

| | | | |
|---|---|---|---|
| 2016/0278050 A1* | 9/2016 | Nory | H04L 5/0053 |
| 2018/0199334 A1* | 7/2018 | Ying | H04W 72/0413 |
| 2018/0241602 A1* | 8/2018 | Bhorkar | H04L 5/0053 |
| 2018/0270799 A1* | 9/2018 | Noh | H04L 1/1812 |
| 2019/0029043 A1* | 1/2019 | Harada | H04L 25/0228 |
| 2019/0075581 A1* | 3/2019 | Salem | H04W 74/006 |
| 2019/0173521 A1* | 6/2019 | Liu | H04B 1/713 |
| 2019/0349965 A1* | 11/2019 | Chakraborty | H04L 1/1614 |
| 2020/0267696 A1* | 8/2020 | Li | H04W 72/10 |
| 2020/0337072 A1* | 10/2020 | Lunttila | H04L 5/0094 |
| 2020/0351667 A1* | 11/2020 | Karaki | H04L 27/0006 |
| 2020/0351923 A1* | 11/2020 | Karaki | H04L 5/0094 |

* cited by examiner

*Primary Examiner* — Jutai Kao
(74) *Attorney, Agent, or Firm* — Dorsey & Whitney LLP

(57) ABSTRACT

Technology for a user equipment (UE) operable for configured grant uplink (UL) transmission in new radio unlicensed (NR-U) is disclosed. The apparatus can comprise one or more processors. The one or more processors can be configured to select, at the UE, a hybrid automatic repeat request process identifier (HARQ process ID) from a set of HARQ IDs. The one or more processors can be configured to insert the HARQ process ID into uplink control information (UCI) on a physical uplink shared channel (PUSCH). The one or more processors can be configured to encode, at the UE, the UCI for transmission to a next generation node B (gNB) via a configured grant uplink transmission using the HARQ process ID.

12 Claims, 14 Drawing Sheets

CONFIGURED GRANT UPLINK (UL) TRANSMISSION IN NEW RADIO UNLICENSED (NR-U)

RELATED APPLICATIONS

The present application claims the benefit of U.S. Provisional Patent Application No. 62/669,842 filed May 10, 2018, the entire specification of which is hereby incorporated by reference in its entirety for all purposes.

BACKGROUND

Wireless systems typically include multiple User Equipment (UE) devices communicatively coupled to one or more Base Stations (BS). The one or more BSs may be Long Term Evolved (LTE) evolved NodeBs (eNB) or new radio (NR) NodeBs (gNB), next generation node Bs (gNB), or new radio base stations (NR BS) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
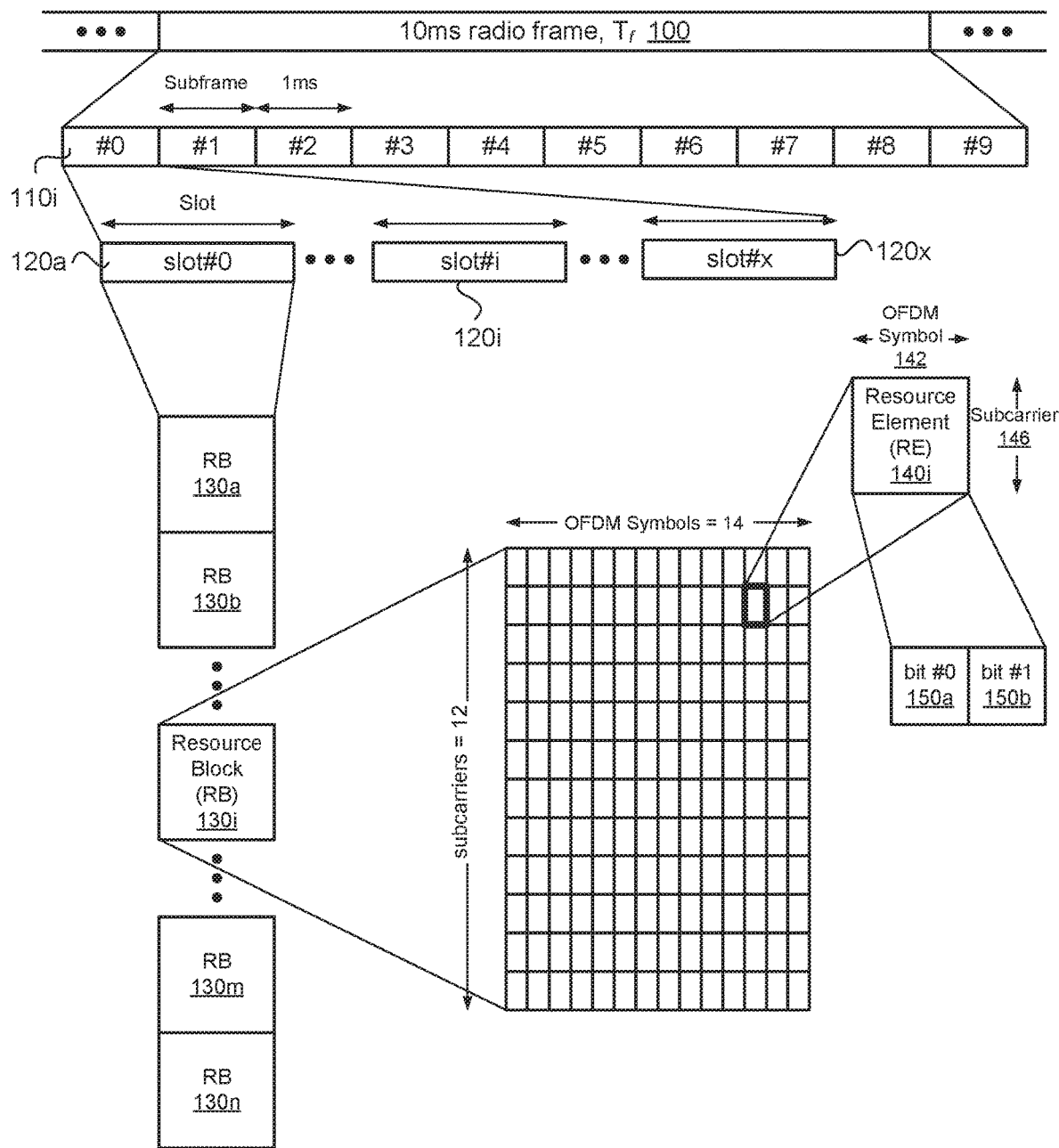
FIG. 1 illustrates a block diagram of a Third-Generation Partnership Project (3GPP) New Radio (NR) Release 15 frame structure in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The number of mobile devices connected to wireless networks increases every year. In order to keep up with the increasing demand in mobile data traffic, system requirements can be changed. Three critical areas can be changed in order to deliver this increase in traffic including larger bandwidth, lower latency, and higher data rates.

One of the main limiting factors in wireless innovation is the availability of spectrum. To mitigate this limitation, unlicensed spectrum has been an area of interest to expand the availability of LTE. In this context, one of the major changes for long term evolution (LTE) in Third Generation Partnership Project (3GPP) Release 13 has been to enable its operation in the unlicensed spectrum via Licensed-Assisted Access (LAA). LAA can expand system bandwidth by utilizing the flexible carrier aggregation (CA) framework introduced by the LTE-Advanced system.

New Radio (NR) can also operate on unlicensed spectrum. NR operation on unlicensed spectrum can include physical channels using duplex mode, waveform, carrier bandwidth, subcarrier spacing, frame structure, and physical layer design and can use unlicensed bands both below 6 gigahertz (GHz) and above 6 GHz, up to 52.6 GHz. NR-based operation in unlicensed spectrum should not impact deployed Wi-Fi services (data, video and voice services) more than an additional Wi-Fi network on the same carrier.

When operating NR in unlicensed spectrum, it can be challenging to maintain fair coexistence with other incumbent technologies. For instance, if operating in the 5 GHz band, a listen before talk (LBT) procedure can be performed to acquire the medium before a transmission may occur. In this case, uplink transmissions can be degraded due to quadruple contention for UEs to access the uplink (UL). Quadruple contention can involve: (1) a UE sending a scheduling request (SR), (2) LBT performed at the next generation node B (gNB) before sending an UL grant to the UE (especially in the case of self-carrier scheduling), (3) the UE scheduling while avoiding internal contention with other UEs associated with the same gNB, and (4) LBT performed only by the scheduled UE. Furthermore, the four subframes used for the processing delay between UL grant and physical uplink shared channel (PUSCH) transmission can represent an additional performance constraint.

To overcome these issues, configured grant UL transmission can be used in unlicensed NR. Grant-free uplink transmission (e.g., grant-free UL transmission) can have the following advantages over scheduled UL transmission. First, a UE that successfully performs LBT can start transmitting immediately as Wi-Fi, and avoid the multiple contention steps used for UE access. Second, configured grant UL transmission does not depend on an UL grant. Third, it can coexist with Wi-Fi.

In another example, a user equipment (UE) can be operable for configured grant uplink (UL) transmission in new radio unlicensed (NR-U). The UE can comprise one or more processors. The one or more processors can be configured to select, at the UE, a hybrid automatic repeat request process identifier (HARQ process ID) from a set of HARQ IDs. The one or more processors can be configured to insert the HARQ process ID into uplink control information (UCI) on a physical uplink shared channel (PUSCH). The one or more processors can be configured to encode, at the UE, the UCI for transmission to a next generation node B (gNB) via a configured grant uplink transmission using the HARQ process ID.

FIG. 1 provides an example of a 3GPP NR Release 15 frame structure. In particular, FIG. 1 illustrates a downlink radio frame structure. In the example, a radio frame 100 of a signal used to transmit the data can be configured to have a duration, $T_f$, of 10 milliseconds (ms). Each radio frame can be segmented or divided into ten subframes 110$i$ that are each 1 ms long. Each subframe can be further subdivided into one or multiple slots 120$a$, 120$i$, and 120$x$, each with a duration, $T_{slot}$, of 1/μ ms, where μ=1 for 15 kHz subcarrier spacing, μ=2 for 30 kHz, μ=4 for 60 kHz, μ=8 for 120 kHz, and u=16 for 240 kHz. Each slot can include a physical downlink control channel (PDCCH) and/or a physical downlink shared channel (PDSCH).

Each slot for a component carrier (CC) used by the node and the wireless device can include multiple resource blocks (RBs) 130$a$, 130$b$, 130$i$, 130$m$, and 130$n$ based on the CC frequency bandwidth. The CC can have a carrier frequency having a bandwidth. Each slot of the CC can include downlink control information (DCI) found in the PDCCH. The PDCCH is transmitted in control channel resource set (CORESET) which can include one, two or three Orthogonal Frequency Division Multiplexing (OFDM) symbols and multiple RBs.

Each RB (physical RB or PRB) can include 12 subcarriers (on the frequency axis) and 14 orthogonal frequency-division multiplexing (OFDM) symbols (on the time axis) per slot. The RB can use 14 OFDM symbols if a short or normal cyclic prefix is employed. The RB can use 12 OFDM symbols if an extended cyclic prefix is used. The resource block can be mapped to 168 resource elements (REs) using short or normal cyclic prefixing, or the resource block can be mapped to 144 REs (not shown) using extended cyclic prefixing. The RE can be a unit of one OFDM symbol 142 by one subcarrier (i.e., 15 kHz, 30 kHz, 60 kHz, 120 kHz, and 240 kHz) 146.

Each RE 140$i$ can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the NR BS to the UE, or the RB can be configured for an uplink transmission from the UE to the NR BS.

This example of the 3GPP NR Release 15 frame structure provides examples of the way in which data is transmitted, or the transmission mode. The example is not intended to be limiting. Many of the Release 15 features will evolve and change in the 5G frame structures included in 3GPP LTE Release 15, MulteFire Release 1.1, and beyond. In such a system, the design constraint can be on co-existence with multiple 5G numerologies in the same carrier due to the coexistence of different network services, such as eMBB (enhanced Mobile Broadband), mMTC (massive Machine Type Communications or massive IoT) and URLLC (Ultra Reliable Low Latency Communications or Critical Communications). The carrier in a 5G system can be above or below 6 GHz. In one embodiment, each network service can have a different numerology.

In Release 15 NR, two configured grant mechanisms are supported: Type 1 which can be based on radio resource control (RRC) configuration, and Type 2, which can be based on RRC configuration+layer 1 (L1) activation and deactivation.

In the Type 1 mechanism the UE can start grant-free transmission (e.g., configured grant UL transmission) as soon as it is RRC configured without waiting to be activated via an L1 activation message. However, the Type 2 mechanism can be more flexible in configuring the time and frequency domain resources, the UE-specific demodulation reference signal (DMRS) configuration, and the modulation coding scheme (MCS)/transport block size (TBS) values. Furthermore, in the Type 2 mechanism, the network can have more control in managing the set of autonomous UEs. Table 1 depicts some of the different fields of the Type 1 mechanism and the Type 2 mechanism.

TABLE 1

| Field | Type 1 | Type 2 |
| --- | --- | --- |
| Periodicity | RRC | RRC |
| Slot offset | RRC, with respect to subframe number (SFN) = 0 | L1, with respect to downlink control information (DCI) reception |
| Time domain resource allocation | RRC | L1 |
| Frequency domain resource allocation | RRC | L1 |
| UE-specific DMRS configuration | RRC | L1 |
| MCS/TBS value | RRC | L1 |
| Power control related parameters | RRC | RRC |
| Number of repetitions {1, 2, 4, 8} | RRC | RRC |
| Redundancy | RRC | RRC |

TABLE 1-continued

| Field | Type 1 | Type 2 |
| --- | --- | --- |
| version (RV) cycling sequence | | |

In one example, the Type 2 configured grant mechanism can be used in new radio unlicensed (NR-U) for grant-free transmission (e.g., configured grant UL transmission) configuration. In another example, the Type 1 configured grant mechanism can be used in NR-U for grant-free transmission configuration. For purposes of this disclosure, "grant-free transmission" and "configured grant UL transmission" can be used interchangeably.

In one example, a network can configure the set of UEs that can perform grant-free transmission. In another example, multiple repetitions in the time domain may be permitted. In another example, time-domain repetitions may not be permitted when operating in grant-free UL transmission.

In one example, the activation and the release of the grant-free UL transmission mode can be signaled through a dedicated downlink control information (DCI), which can be associated with a configured scheduling radio network temporary identifier (CS-RNTI), or a newly defined radio network temporary identifier (RNTI). In another example, two DCIs can be defined: one DCI can be used for activation and the other DCI can be used for deactivation. In another example, the activation/deactivation DCIs can contain information related to the MCS and the resource block (RB) assignment.

In one example, the medium access control (MAC) control element (CE) can be used to carry the acknowledgement for L1 signaling for activation and/or deactivation of Type 2 UL transmission with configured grant, and it may only be transmitted via scheduled grant UL after the activation and/or deactivation DCIs are received. In another example, grant-free transmission may only start after the UE sends the MAC CE using scheduled grant UL. In another example, the MAC CE acknowledgment can be transmitted at the earliest occasion even if the UE has no data to transmit.

In one example, a timer can be used to trigger activation/deactivation signaling transmission. In this example, the gNB may not receive the acknowledgement because the UE could have missed the signaling or because the channel could be busy. In another example, the timer can be started when the activation/deactivation DCIs are transmitted. In another example, the timer can be stopped and reset when the MAC CE is received by the gNB in response to the activation grant, and it can be started again when an activation grant or reactivation grant is sent. In another example, upon expiration of the timer, the gNB can retransmit the activation grant.

In one example, the UE can send acknowledgement of the deactivation grant to the gNB through a MAC CE transmitted using scheduled grant UL using one or more interlaces. In another example, upon reception of the deactivation grant acknowledgement, the gNB can release the resources for grant-free uplink transmission. In another example, acknowledgement may not be used for deactivation, which can save one or more interlaces with one byte MAC CE transmission. In another example, the UE-ID can be carried in the uplink control information (UCI). In this example, the deactivation grant acknowledgement may not be used because the gNB can determine whether grant free uplink is deactivated for a UE by detecting grant-free uplink transmissions, and determining if the UE-ID is in the UCI of the grant-free uplink transmission. In another example, when the gNB detects a UE-ID in the UCI that corresponds to the UE that the gNB intends to deactivate, the gNB can retransmit a deactivation grant.

In one example, the UL hybrid automatic repeat request process identifier (HARQ ID or HARQ process ID) can be dictated by a formula, which can be based on the utilized resources. In one example, UL HARQ ID=(10 SFN+SF) modulo X, where X can be the total number of HARQ process IDs supported, SFN can be the subframe number, and SF can be the subframe. In another example, the calculation of a UL HARQ process ID can be based on one or more of a SFN, symbol, or slot.

In another example, more flexibility can be provided when the HARQ process IDs that can be used for configured grant transmission are RRC signaled through a bitmap or fixed. In another example, the HARQ process IDs configured for configured grant transmission can be indicated in the activation/deactivation DCIs. In another example, a UE can be configured with a set of HARQ process IDs used for configured grant transmission. In another example, a UE can choose independently the ID to use for a provided configured grant transmission from this set of HARQ process IDs.

In another example, a UE can be configured to select a HARQ process ID from a set of HARQ IDs. The UE can be configured to insert the HARQ process ID into uplink control information (UCI) on a physical uplink shared channel (PUSCH). The UE can be configured to encode the UCI for transmission to a gNB via a configured grant UL transmission using the HARQ process ID. In another example, the UE can be configured to decode the set of HARQ IDs received from the gNB via RRC signaling, wherein the set of HARQ IDs can enable configured grant UL transmission at the UE.

In another example, a UE can be configured to decode a bitmap indicating the set of HARQ IDs. The set of HARQ IDs can be used for grant-free transmission or configured grant transmission. In another example, the indication of the set of HARQ IDs can be configured by providing the number, N, of HARQ IDs that can be used for grant-free transmission or configured grant transmission, wherein N is a positive integer. The set of HARQ IDs can be a contiguous number N of HARQ IDs starting from the lowest or the highest HARQ-ID. The set of HARQ IDs enabled for grant-free transmission or configured grant transmission can be indicated by providing one or more of the number N of HARQ IDs or the starting HARQ ID from which N contiguous HARQ IDs are enabled.

In another example, the set of HARQ IDs configured for configured grant uplink transmission can be also configured for scheduled uplink transmission. In another example, the set of HARQ IDs configured for configured grant uplink transmission can be different from the set of HARQ IDs configured for scheduled uplink transmission. In another example, the set of HARQ IDs can be used for scheduled uplink transmission or re-transmission or configured grant UL transmission or retransmission.

In another example, if the UE selects the HARQ ID to use for a configured grant transmission, the UE can indicate the HARQ ID used and the UE ID in the UCI to inform the gNB. In another example, to reduce complexity at the gNB, the UCI on the PUSCH of the configured grant transmission can be scrambled with a common radio network temporary identifier (RNTI) and not with a UE-specific RNTI.

In another example, both scheduled uplink retransmission and configured grant uplink retransmission can be supported for configured grant transmissions. In another example, a UE can autonomously retransmit according to one or more of the following conditions: (1) after the UE receives a negative acknowledgment (NACK) feedback; (2) no indication is received from the gNB for X subframes since the transmission of a HARQ process in configured grant transmission, wherein X is a positive integer; or (3) the UE can blindly retransmit.

In another example, a UE can be configured to retransmit the PUSCH including the UCI via configured grant UL transmission or a scheduled UL transmission when the UE receives NACK feedback from the gNB or a timer for the configured grant UL transmission expires.

Figure 2:
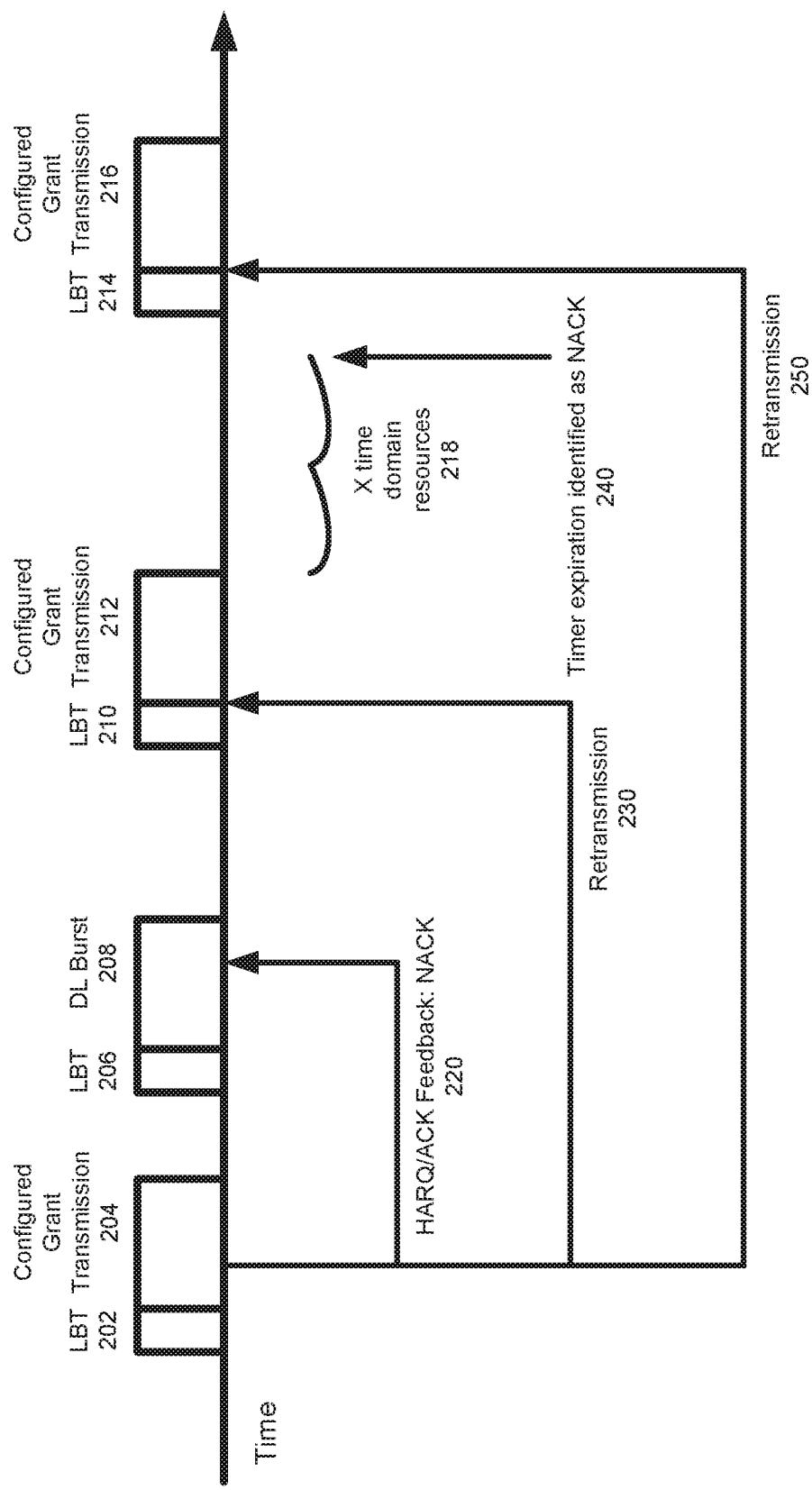
FIG. 2 illustrates hybrid automatic repeat request (HARQ) acknowledgment (ACK) (HARQ-ACK) in accordance with an example.

In another example, as illustrated in FIG. 2, hybrid automatic repeat request (HARQ) acknowledgment (ACK) (HARQ-ACK) can be used for configured grant transmission. Time-domain resources for listen before talk (LBT) 202, 206, 210, and 214 can be contiguous with time-domain resources for configured grant transmission 204, downlink burst 208, configured grant transmission 212, and configured grant transmission 216, respectively. A configured grant transmission 204 can be transmitted using the time-domain resources indicated by 204. A HARQ/ACK NACK feedback 220 can be received using the time-domain resources indicated by 208. A retransmission configured grant transmission 230 can be transmitted using the time-domain resources indicated by 212. A retransmission configured grant transmission 250 can be transmitted using the time-domain resources indicated by 216 indicated by X time-domain resources 218 when a timer expiration is identified as NACK 240.

In another example, the time-domain resources can be RRC configured, and the time-domain resources can repeat with a periodicity that is fixed or configurable. In another example, the time-domain resources configured for configured grant transmission can be indicated through a bitmap. The bitmap can comprise X bits, where X can be a positive integer (e.g., 40). In another example, the bitmap can indicate the time-domain resources in units of symbols, slots, or milliseconds (ms).

In another example, a UE can be configured to decode a bitmap indicating time-domain resources for configured grant UL transmission, wherein the bitmap can be received from a gNB via RRC signaling, and wherein the bitmap can include a periodicity indicating repetition of the time-domain resources.

Figure 3A:
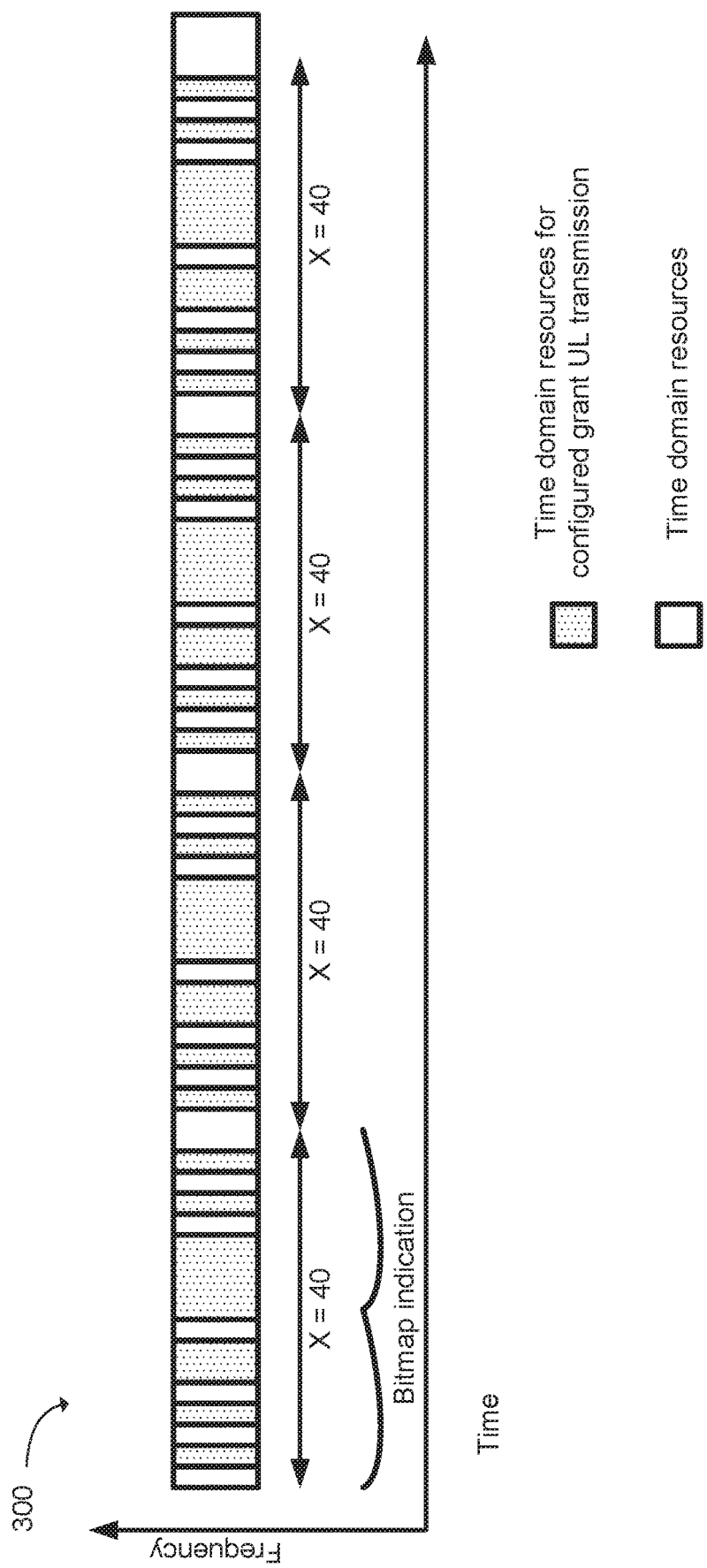
FIG. 3a illustrates time domain resource allocation in accordance with an example.

In another example, as illustrated in FIG. 3a, time-domain resources 300 can include time domain resources for configured grant UL transmission and time domain resources. Bitmap indication can include the time domain resources as illustrated, wherein X can be 40 bits. The bitmap can include a periodicity.

In another example, the time-domain resources available for configured grant transmission can be derived from a tuple of parameters (i.e., {periodicity, offset/starting position, and/or duration}). These parameters can be RRC configured. In one example, the "offset/starting position" parameter can indicate the starting position of the time-domain resources configured for configured grant UL transmission, the "duration" parameter can indicate the consecutive time-domain resources configured for configured grant transmission starting from the offset/starting position, and the "periodicity" parameter can indicate the period after which a defined window of available resources for configured grant transmissions can be repeated.

Figure 3B:
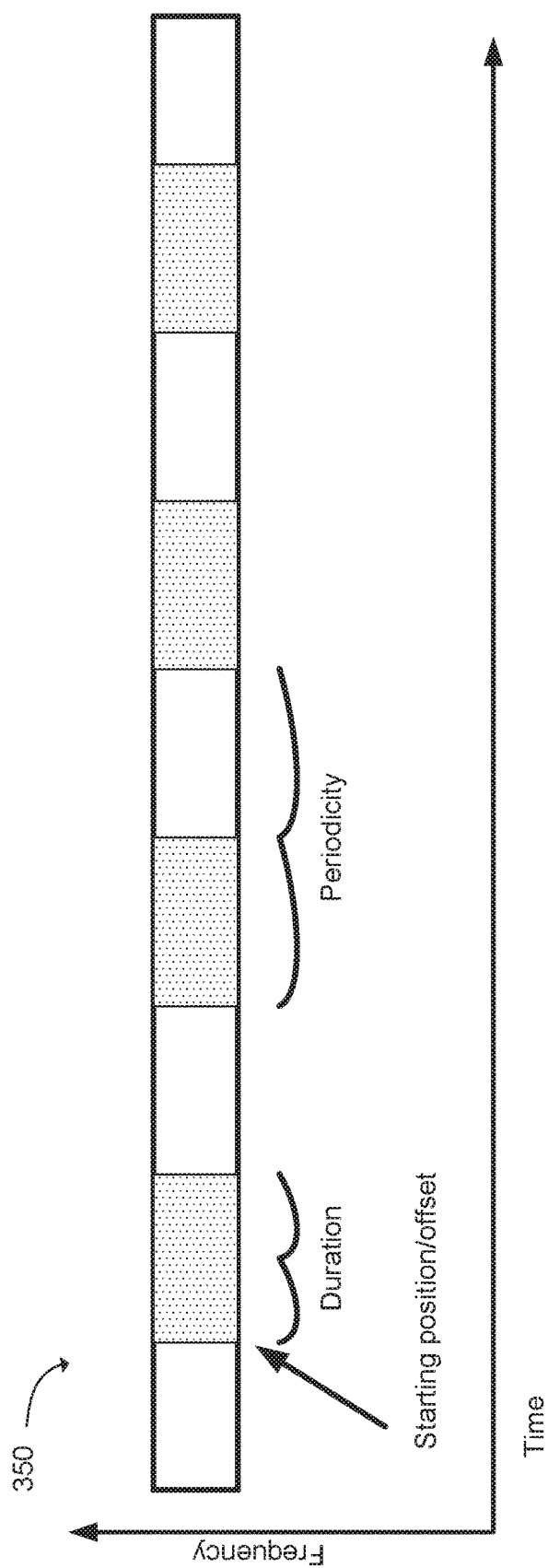
FIG. 3b illustrates time domain resource allocation in accordance with an example.

In another example, a UE can be configured to identify starting symbols within a slot for the configured grant UL transmission. As illustrated in FIG. 3b, time-domain resources 350 can include parameters such as a starting position or offset, a duration, and a periodicity.

In another example, the frequency-domain resources can be indicated to the UE by the gNB via the activation/deactivation DCIs. In another example, the frequency-domain resources can be indicated to the UE by RRC signalling.

In another example, a UE can be configured to identify time-domain resources configured by the gNB, wherein the time-domain resources that overlap with time domain resources configured by a discovery reference signal (DRS) transmission are not enabled for configured grant UL transmission.

In another example, the gNB can configure the time-domain resources for configured grant uplink transmission, wherein time-domain resources are not allocated for configured grant uplink transmission within the synchronization signal (SS) block-based radio resource management (RRM) measurement timing configuration (SMTC) window. In another example, the UE can be configured to transmit in any time-domain resources configured by the gNB. In another example, the UE may not be configured to transmit in any time-domain resources within the SMTC window.

Figure 4:
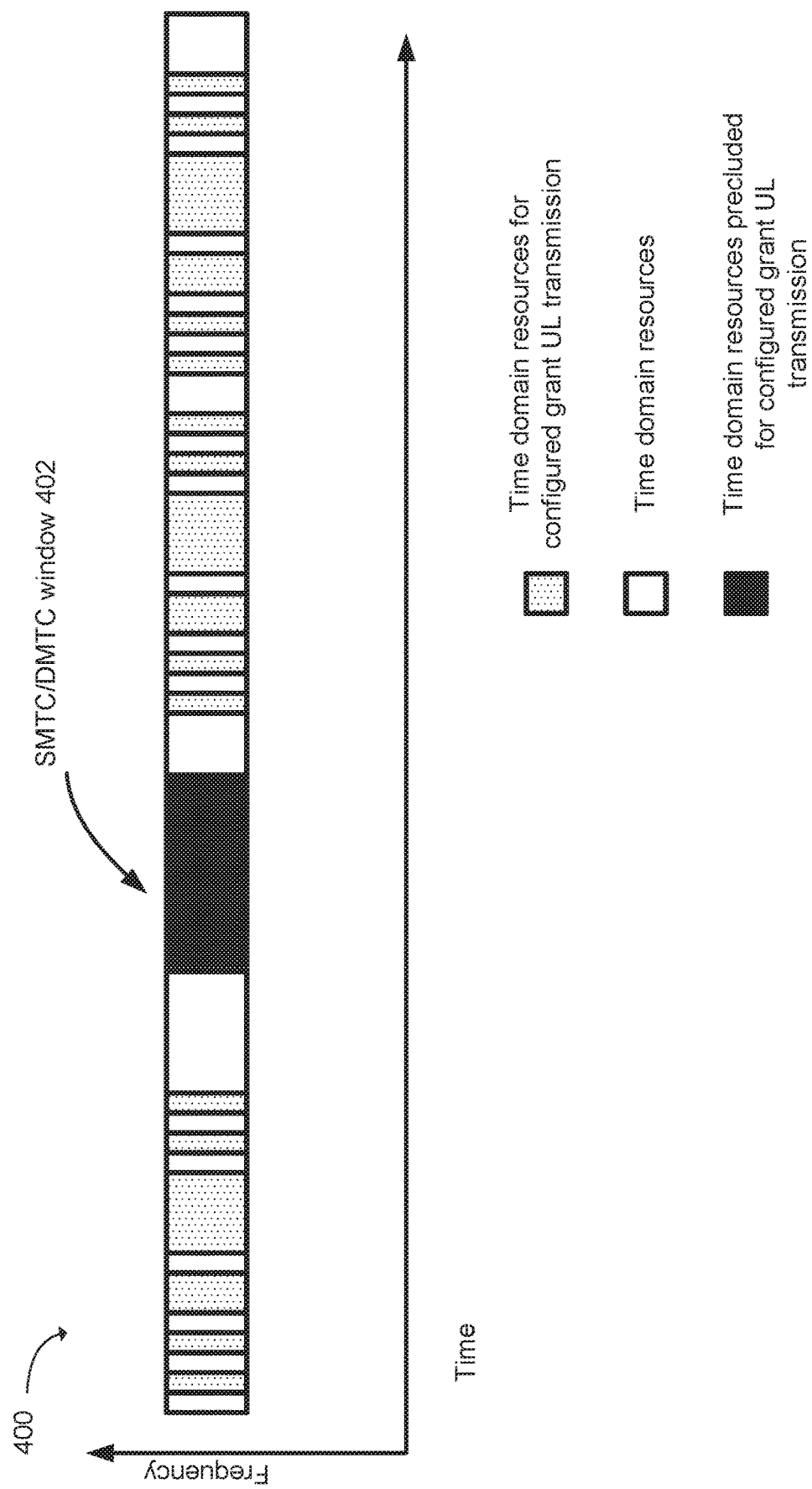
FIG. 4 illustrates time domain resource allocation in accordance with an example.

In another example, as illustrated by FIG. 4, time-domain resources 400 can include an SMTC window 402 or a discovery reference signal (DRS) measurement timing configuration (DMTC). The time-domain resources can include time-domain resources configured for configured grant UL transmission or time-domain resources precluded for configured grant UL transmission.

Figure 5:
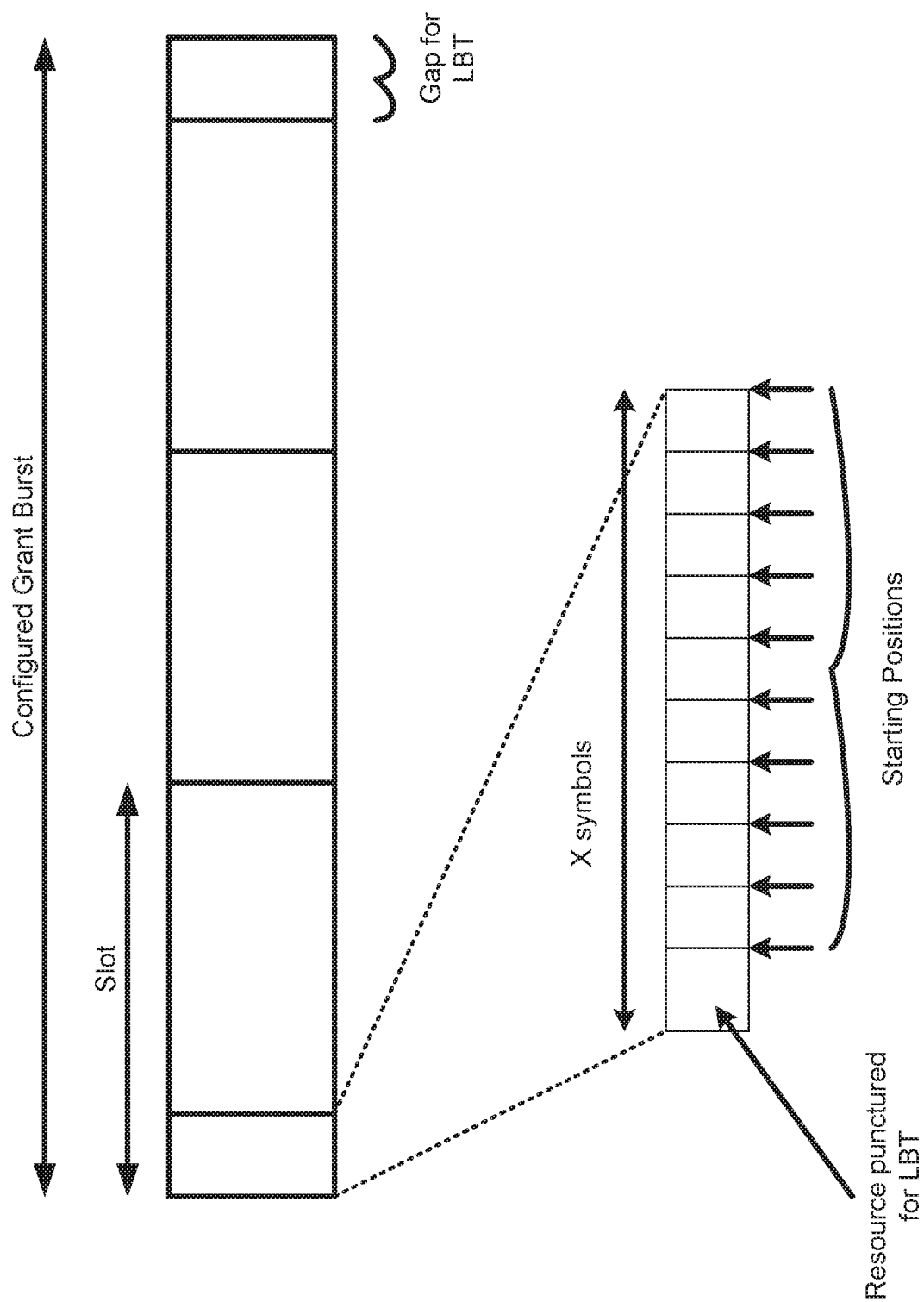
FIG. 5 illustrates collision avoidance in accordance with an example.

In another example, a UE can be configured to identify a gap in time between configured grant UL resources and non-configured grant UL resources. In another example, as illustrated in FIG. 5, a configured grant burst can include a slot and a gap for LBT. The slot can include X symbols comprised of resources punctured for LBT and possible starting positions.

In another example, a gap can be permitted between slots of a contiguous configured grant UL transmission. In another example, a LBT gap can be configurable. In another example, the first X symbols and/or the last Y symbols of a slot or a mini-slot can be blank for clear channel assessment (CCA)/enhanced CCA (eCCA). In another example, the starting position of a configured grant UL transmission can be configured and the previous X symbols can be blank for CCA/eCCA. In another example, to mitigate collisions among configured grant transmission UEs, the system can operate using time division multiplexing (TDM). In another example, the UEs can select randomly the starting position from a configured grant UL transmission specific set of starting offset values, which can be based on whether the configured grant UL transmission occurs in the gNB acquired maximum channel occupancy times (MCOT). In another example, if the system operates using frequency division multiplexing (FDM), the UE can be RRC configured with an exact configured grant UL transmission specific PUSCH starting offset value. In another example, for either TDM or FDM, the PUSCH starting offset value can be RRC configured.

Figure 6:
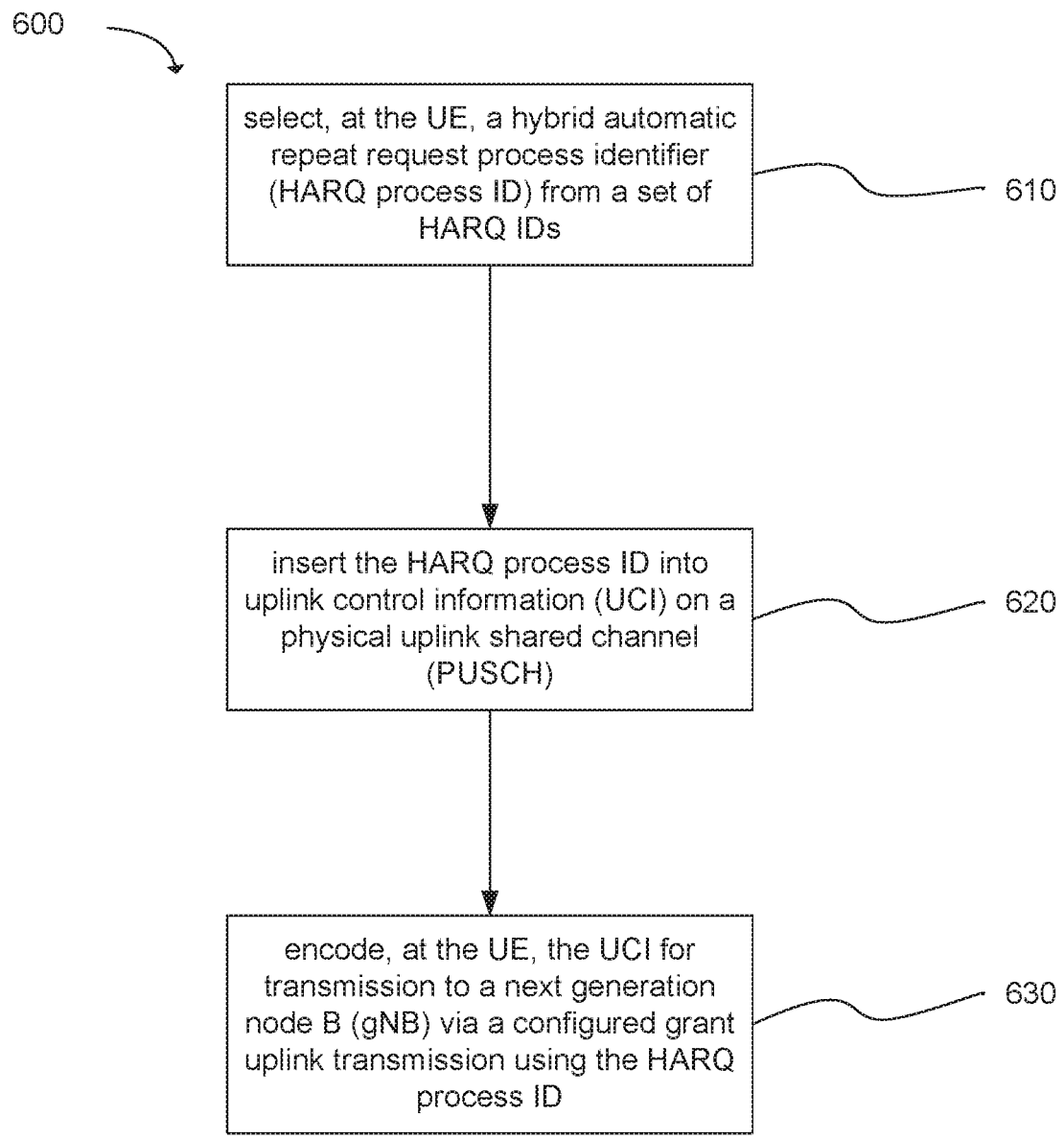
FIG. 6 depicts functionality of a user equipment (UE) operable for configured grant uplink (UL) transmission in accordance with an example.

Another example provides functionality 600 of a UE operable for configured grant uplink (UL) transmission in new radio unlicensed (NR-U), as shown in FIG. 6. The UE can comprise one or more processors. The one or more processors can be configured to select, at the UE, a hybrid automatic repeat request process identifier (HARQ process ID) from a set of HARQ IDs, as in block 610. The one or more processors can be configured to insert the HARQ process ID into uplink control information (UCI) on a physical uplink shared channel (PUSCH), as in block 620. The one or more processors can be configured to encode, at the UE, the UCI for transmission to a next generation node B (gNB) via a configured grant uplink transmission using the HARQ process ID, as in block 630. In addition, the UE can comprise a memory interface configured to send the HARQ process ID to a memory.

Figure 7:
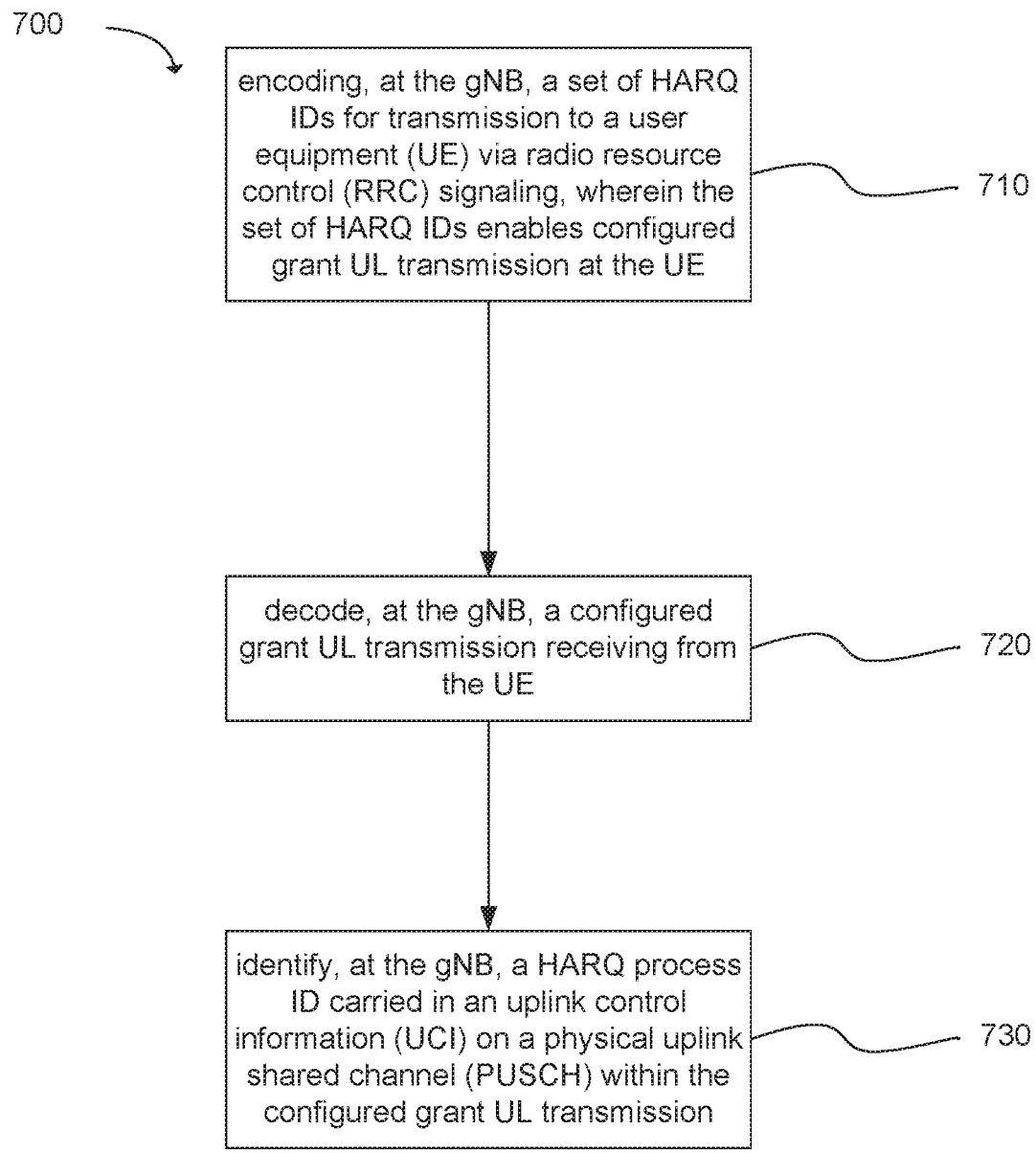
FIG. 7 depicts functionality of a next generation node B (gNB) operable for configured grant uplink (UL) transmission in accordance with an example.

Another example provides functionality 700 of a next generation node B (gNB) operable for configured grant uplink (UL) transmission in new radio unlicensed (NR-U), as shown in FIG. 7. The gNB can comprise one or more processors. The one or more processors can be configured to encode, at the gNB, a set of HARQ IDs for transmission to a user equipment (UE) via radio resource control (RRC) signaling, wherein the set of HARQ IDs enables configured grant UL transmission at the UE, as in block 710. The one or more processors can be configured to decode, at the gNB, a configured grant UL transmission received from the UE, as in block 720. The one or more processors can be configured to identify, at the gNB, a HARQ process ID carried in an uplink control information (UCI) on a physical uplink shared channel (PUSCH) within the configured grant UL transmission, as in block 730. In addition, the gNB can comprise a memory interface configured to send the HARQ process ID to a memory.

Figure 8:
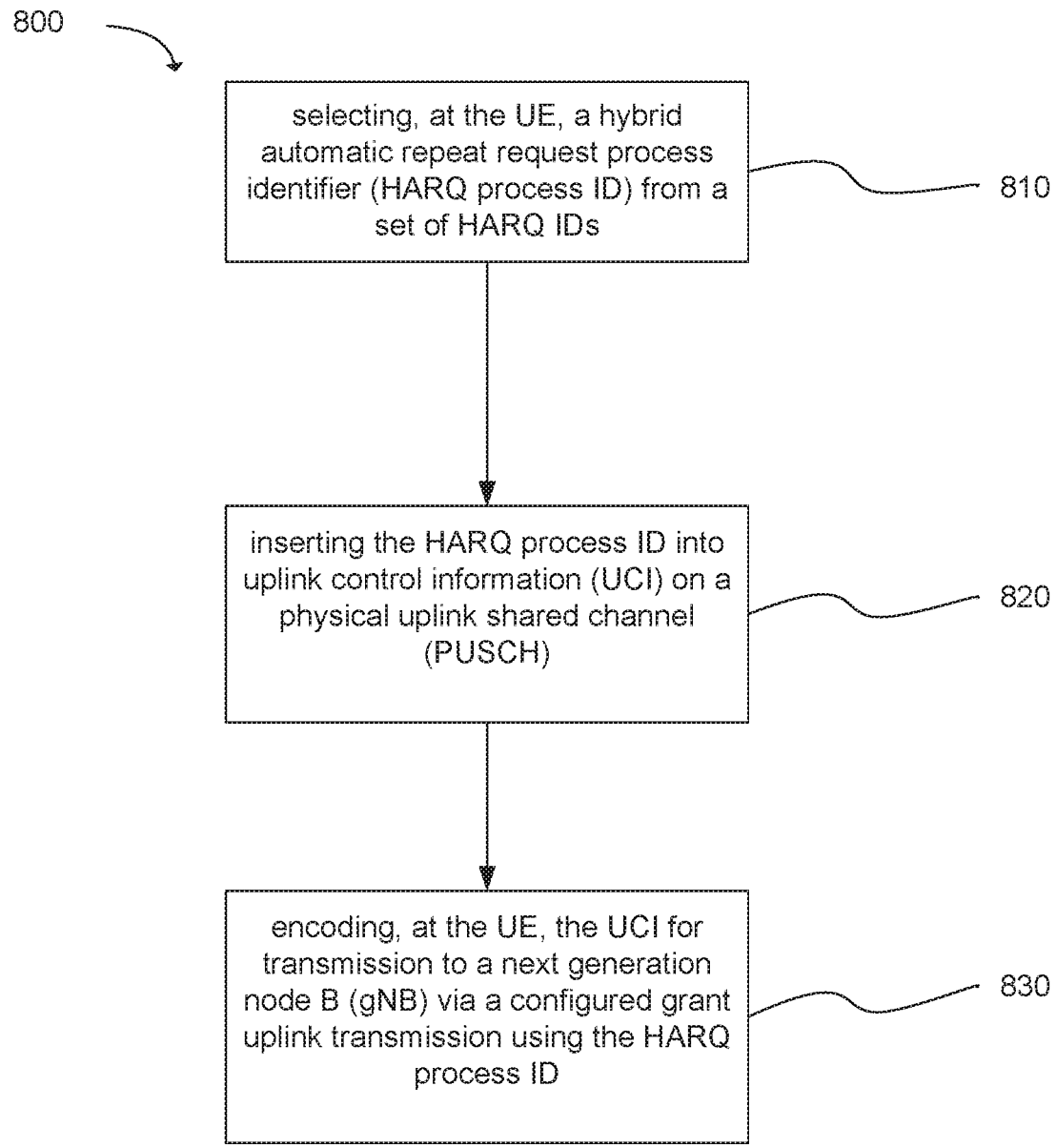
FIG. 8 depicts a flowchart of a machine readable storage medium having instructions embodied thereon for configured grant uplink (UL) transmission in accordance with an example.

Another example provides at least one machine readable storage medium having instructions 800 embodied thereon for configured grant uplink (UL) transmission in new radio unlicensed (NR-U), as shown in FIG. 8. The instructions can be executed on a machine, where the instructions are included on at least one computer readable medium or one non-transitory machine readable storage medium. The instructions when executed perform: selecting, at the UE, a hybrid automatic repeat request process identifier (HARQ process ID) from a set of HARQ IDs, as in block 810. The instructions when executed perform: inserting the HARQ process ID into uplink control information (UCI) on a physical uplink shared channel (PUSCH), as in block 820. The instructions when executed perform: encoding, at the UE, the UCI for transmission to a next generation node B (gNB) via a configured grant uplink transmission using the HARQ process ID, as in block 830.

While examples have been provided in which a gNB has been specified, they are not intended to be limiting. An evolved node B (eNB) can be used in place of a next generation node B (gNB), a new radio node B (gNB), or a new radio base station (NR BS). Accordingly, unless otherwise stated, any example herein in which a gNB has been disclosed, can similarly be disclosed with the use of eNB or new radio base station (NR BS).

Figure 9:
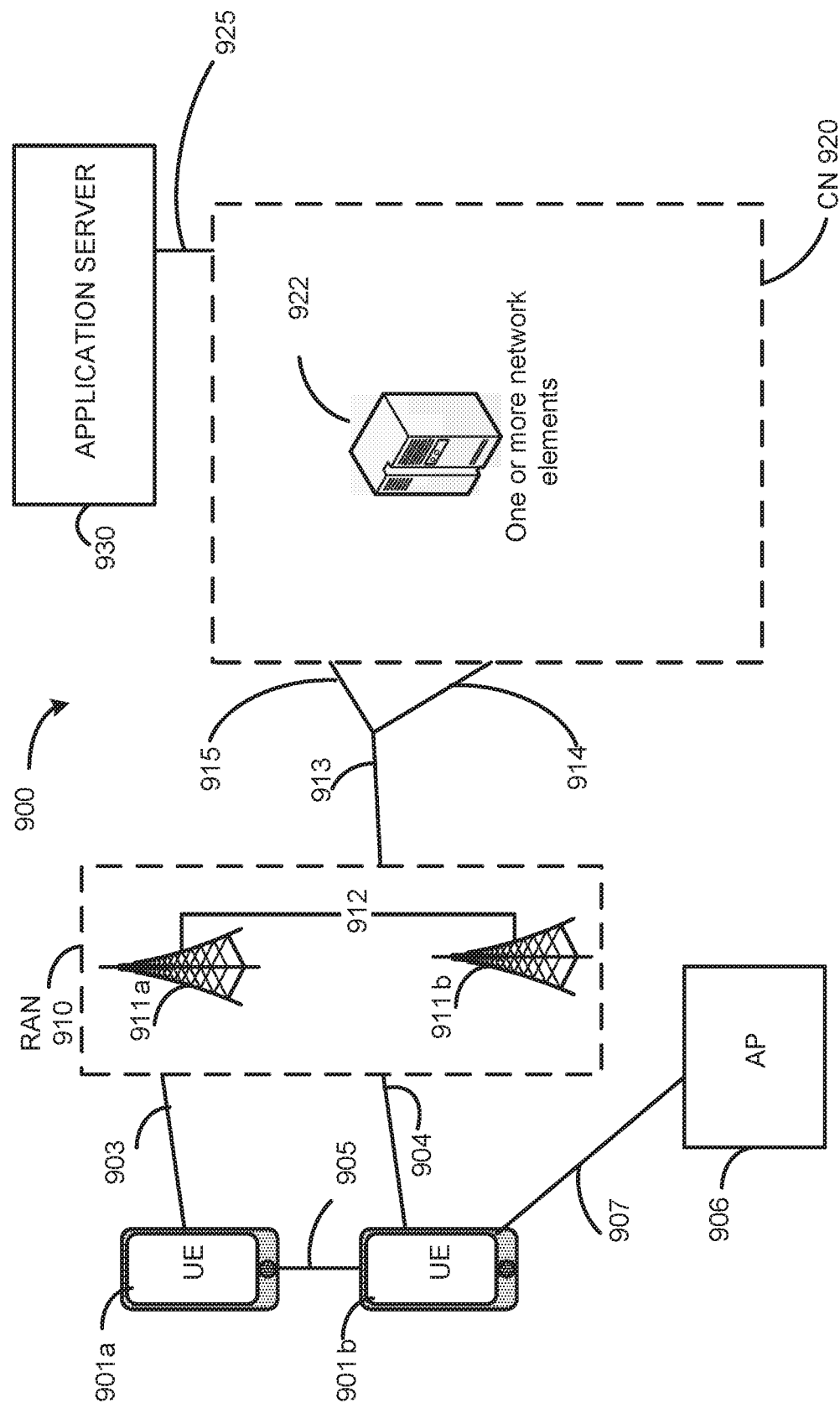
FIG. 9 illustrates an example architecture of a system of a network in accordance with an example.

FIG. 9 illustrates an example architecture of a system 900 of a network, in accordance with various embodiments. The following description is provided for an example system 900 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 9, the system 900 includes UE 901*a* and UE 901*b* (collectively referred to as "UEs 901" or "UE 901"). In this example, UEs 901 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 901 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 901 may be configured to connect, for example, communicatively couple, with an or RAN 910. In embodiments, the RAN 910 may be an NG RAN or a 5G RAN, an E-UTRAN, or a legacy RAN, such as a UTRAN or GERAN. As used herein, the term "NG RAN" or the like may refer to a RAN 910 that operates in an NR or 5G system 900, and the term "E-UTRAN" or the like may refer to a RAN 910 that operates in an LTE or 4G system 900. The UEs 901 utilize connections (or channels) 903 and 904, respectively, each of which comprises a physical communications interface or layer (discussed in further detail below).

In this example, the connections 903 and 904 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 901 may directly exchange communication data via a ProSe interface 905. The ProSe interface 905 may alternatively be referred to as a SL interface 905 and may comprise one or more logical channels, including but not limited to a PSCCH, a PSSCH, a PSDCH, and a PSBCH.

The UE 901*b* is shown to be configured to access an AP 906 (also referred to as "WLAN node 906," "WLAN 906," "WLAN Termination 906," "WT 906" or the like) via connection 907. The connection 907 can comprise a local wireless connection, such as a connection consistent with any IEEE 802.11 protocol, wherein the AP 906 would comprise a wireless fidelity (Wi-Fi®) router. In this example, the AP 906 is shown to be connected to the Internet without connecting to the core network of the wireless system (described in further detail below). In various embodiments, the UE 901*b*, RAN 910, and AP 906 may be configured to utilize LWA operation and/or LWIP operation. The LWA operation may involve the UE 901*b* in RRC_CO- NNECTED being configured by a RAN node 911*a-b* to utilize radio resources of LTE and WLAN. LWIP operation may involve the UE 901*b* using WLAN radio resources (e.g., connection 907) via IPsec protocol tunneling to authenticate and encrypt packets (e.g., IP packets) sent over the connection 907. IPsec tunneling may include encapsulating the entirety of original IP packets and adding a new packet header, thereby protecting the original header of the IP packets.

The RAN 910 can include one or more AN nodes or RAN nodes 911*a* and 911*b* (collectively referred to as "RAN nodes 911" or "RAN node 911") that enable the connections 903 and 904. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 911 that operates in an NR or 5G system 900 (for example, a gNB), and the term "E-UTRAN node" or the like may refer to a RAN node 911 that operates in an LTE or 4G system 900 (e.g., an eNB). According to various embodiments, the RAN nodes 911 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 911 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 911; a MAC/PHY split wherein RRC, PDCP, RLC, and MAC layers are operated by the CRAN/vBBUP and the PHY layer is operated by individual RAN nodes 911; or a "lower PHY" split wherein RRC, PDCP, RLC, MAC layers and upper portions of the PHY layer are operated by the CRAN/vBBUP and lower portions of the PHY layer are operated by individual RAN nodes 911. This virtualized framework allows the freed-up processor cores of the RAN nodes 911 to perform other virtualized applications. In some implementations, an individual RAN node 911 may represent individual gNB-DUs that are connected to a gNB-CU via individual F1 interfaces (not shown by FIG. 9). In these implementations, the gNB-DUs may include one or more remote radio heads or RFEMs, and the gNB-CU may be operated by a server that is located in the RAN 910 (not shown) or by a server pool in a similar manner as the CRAN/vBBUP. Additionally or alternatively, one or more of the RAN nodes 911 may be next generation eNBs (ng-eNBs), which are RAN nodes that provide E-UTRA user plane and control plane protocol terminations toward the UEs 901, and are connected to a 5GC via an NG interface (discussed infra).

In V2X scenarios one or more of the RAN nodes 911 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 901 (vUEs 901). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 911 can terminate the air interface protocol and can be the first point of contact for the UEs 901. In some embodiments, any of the RAN nodes 911 can fulfill various logical functions for the RAN 910 including, but not limited to, radio network controller (RNC) functions such as radio bearer management, uplink and downlink dynamic radio resource management and data packet scheduling, and mobility management.

In embodiments, the UEs 901 can be configured to communicate using OFDM communication signals with each other or with any of the RAN nodes 911 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 911 to the UEs 901, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 901 and the RAN nodes 911 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 901 and the RAN nodes 911 may operate using LAA, eLAA, and/or feLAA mechanisms. In these implementations, the UEs 901 and the RAN nodes 911 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 901 RAN nodes 911, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 901, AP 906, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 901 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 901. The PDCCH carries information about the transport format and resource allocations related to the PDSCH channel, among other things. It may also inform the UEs 901 about the transport format, resource allocation, and HARQ information related to the uplink shared channel. Typically, downlink scheduling (assigning control and shared channel resource blocks to the UE 901b within a cell) may be performed at any of the RAN nodes 911 based on channel quality information fed back from any of the UEs 901. The downlink resource assignment information may be sent on the PDCCH used for (e.g., assigned to) each of the UEs 901.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 911 may be configured to communicate with one another via interface 912. In embodiments where the system 900 is an LTE system (e.g., when CN 920 is an EPC), the interface 912 may be an X2 interface 912. The X2 interface may be defined between two or more RAN nodes 911 (e.g., two or more eNBs and the like) that connect to EPC 920, and/or between two eNBs connecting to EPC 920. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 901 from an SeNB for user data; information of PDCP PDUs that were not delivered to a UE 901; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 900 is a 5G or NR system, the interface 912 may be an Xn interface 912. The Xn interface is defined between two or more RAN nodes 911 (e.g., two or more gNBs and the like) that connect to 5GC 920, between a RAN node 911 (e.g., a gNB) connecting to 5GC 920 and an eNB, and/or between two eNBs connecting to 5GC 920. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 901 in a connected mode (e.g., CM-CONNECTED) including functionality to manage the UE mobility for connected mode between one or more RAN nodes 911. The mobility support may include context transfer from an old (source) serving RAN node 911 to new (target) serving RAN node 911; and control of user plane tunnels between old (source) serving RAN node 911 to new (target) serving RAN node 911. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 910 is shown to be communicatively coupled to a core network—in this embodiment, core network (CN) 920. The CN 920 may comprise a plurality of network elements 922, which are configured to offer various data and telecommunications services to customers/subscribers (e.g., users of UEs 901) who are connected to the CN 920 via the RAN 910. The components of the CN 920 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 920 may be referred to as a network slice, and a logical instantiation of a portion of the CN 920 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 930 may be an element offering applications that use IP bearer resources with the core network (e.g., UMTS PS domain, LTE PS data services, etc.). The application server 930 can also be configured to support one or more communication services (e.g., VoIP sessions, PTT sessions, group communication sessions, social networking services, etc.) for the UEs 901 via the EPC 920.

In embodiments, the CN 920 may be a 5GC (referred to as "5GC 920" or the like), and the RAN 910 may be connected with the CN 920 via an NG interface 913. In embodiments, the NG interface 913 may be split into two parts, an NG user plane (NG-U) interface 914, which carries traffic data between the RAN nodes 911 and a UPF, and the S1 control plane (NG-C) interface 915, which is a signaling interface between the RAN nodes 911 and AMFs.

In embodiments, the CN 920 may be a 5G CN (referred to as "5GC 920" or the like), while in other embodiments, the CN 920 may be an EPC). Where CN 920 is an EPC (referred to as "EPC 920" or the like), the RAN 910 may be connected with the CN 920 via an S1 interface 913. In embodiments, the S1 interface 913 may be split into two parts, an S1 user plane (S1-U) interface 914, which carries traffic data between the RAN nodes 911 and the S-GW, and the S1-MME interface 915, which is a signaling interface between the RAN nodes 911 and MMEs.

Figure 10:
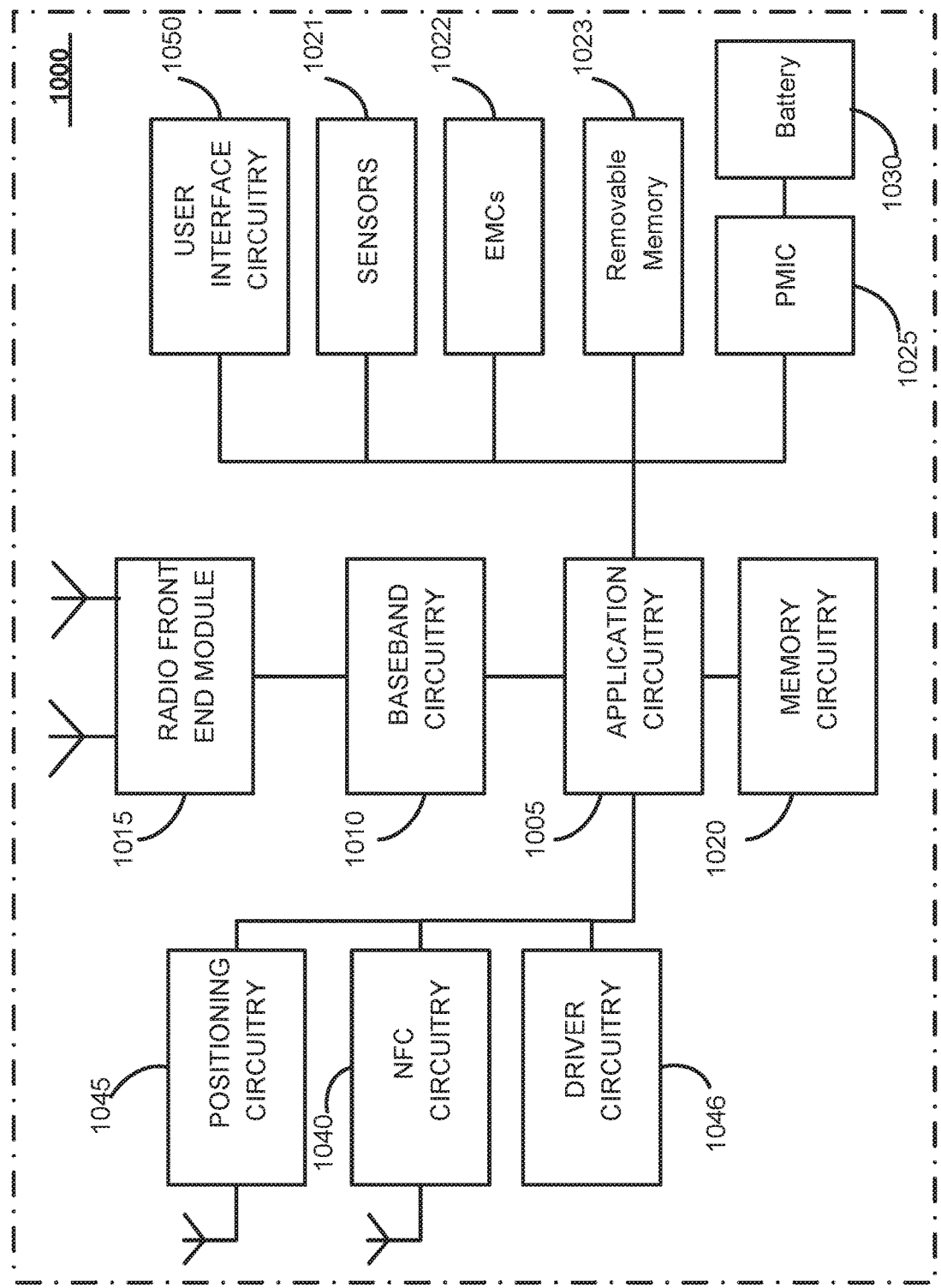
FIG. 10 illustrates an example of a platform or device in accordance with an example.

FIG. 10 illustrates an example of a platform 1000 (or "device 1000") in accordance with various embodiments. In embodiments, the computer platform 1000 may be suitable for use as UE 901, application servers 930, and/or any other element/device discussed herein. The platform 1000 may include any combinations of the components shown in the example. The components of platform 1000 may be implemented as integrated circuits (ICs), portions thereof, discrete electronic devices, or other modules, logic, hardware, software, firmware, or a combination thereof adapted in the computer platform 1000, or as components otherwise incorporated within a chassis of a larger system. The block diagram of FIG. 10 is intended to show a high level view of components of the computer platform 1000. However, some of the components shown may be omitted, additional components may be present, and different arrangement of the components shown may occur in other implementations.

Application circuitry 1005 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1005 may be coupled with or may include memory/storage elements and may be configured to execute instructions stored in the memory/storage to enable various applications or operating systems to run on the system 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

As examples, the processor(s) of application circuitry 1005 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 1005 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1005 may be a part of a system on a chip (SoC) in which the application circuitry 1005 and other components are formed into a single integrated circuit, or a single package, such as the Edison™ or Galileo™ SoC boards from Intel® Corporation.

Additionally or alternatively, application circuitry 1005 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1005 may comprise logic blocks or logic fabric, and other interconnected resources that may be programmed to perform various functions, such as the procedures, methods, functions, etc. of the various embodiments discussed herein. In such embodiments, the circuitry of application circuitry 1005 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1010 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1010 are discussed infra with regard to FIG. 11.

The RFEMs 1015 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1111 of FIG. 11 infra), and the RFEM may be connected to multiple antennas. In alternative implementations, both mmWave and sub-mmWave radio functions may be implemented in the same physical RFEM 1015, which incorporates both mmWave antennas and sub-mmWave.

The memory circuitry 1020 may include any number and type of memory devices used to provide for a given amount of system memory. As examples, the memory circuitry 1020 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 1020 may be developed in accordance with a Joint Electron Devices Engineering Council (JEDEC) low power double data rate (LPDDR)-based design, such as LPDDR2, LPDDR3, LPDDR4, or the like. Memory circuitry 1020 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1020 may be on-die memory or registers associated with the application circuitry 1005. To provide for persistent storage of information such as data, applications, operating systems and so forth, memory circuitry 1020 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 1000 may incorporate the three-dimensional (3D) cross-point (XPOINT) memories from Intel® and Micron®.

Removable memory circuitry 1023 may include devices, circuitry, enclosures/housings, ports or receptacles, etc. used to couple portable data storage devices with the platform 1000. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1000 may also include interface circuitry (not shown) that is used to connect external devices with the platform 1000. The external devices connected to the platform 1000 via the interface circuitry include sensor circuitry 1021 and electro-mechanical components (EMCs) 1022, as well as removable memory devices coupled to removable memory circuitry 1023.

The sensor circuitry 1021 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1022 include devices, modules, or subsystems whose purpose is to enable platform 1000 to change its state, position, and/or orientation, or move or control a mechanism or (sub)system. Additionally, EMCs 1022 may be configured to generate and send messages/signalling to other components of the platform 1000 to indicate a current state of the EMCs 1022. Examples of the EMCs 1022 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1000 is configured to operate one or more EMCs 1022 based on one or more captured events and/or instructions or control signals received from a service provider and/or various clients.

In some implementations, the interface circuitry may connect the platform 1000 with positioning circuitry 1045. The positioning circuitry 1045 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1045 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1045 may include a Micro-PNT IC that uses a master timing clock to perform position tracking/estimation without GNSS assistance. The positioning circuitry 1045 may also be part of, or interact with, the baseband circuitry and/or RFEMs 1015 to communicate with the nodes and components of the positioning network. The positioning circuitry 1045 may also provide position data and/or time data to the application circuitry 1005, which may use the data to synchronize operations with various infrastructure (e.g., radio base stations), for turn-by-turn navigation applications, or the like In some implementations, the interface circuitry may connect the platform 1000 with Near-Field Communication (NFC) circuitry 1040. NFC circuitry 1040 is configured to provide contactless, short-range communications based on radio frequency identification (RFID) standards, wherein magnetic field induction is used to enable communication between NFC circuitry 1040 and NFC-enabled devices external to the platform 1000 (e.g., an "NFC touchpoint"). NFC circuitry 1040 comprises an NFC controller coupled with an antenna element and a processor coupled with the NFC controller. The NFC controller may be a chip/IC providing NFC functionalities to the NFC circuitry 1040 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1040, or initiate data transfer between the NFC circuitry 1040 and another active NFC device (e.g., a smartphone or an NFC-enabled POS terminal) that is proximate to the platform 1000.

The driver circuitry 1046 may include software and hardware elements that operate to control particular devices that are embedded in the platform 1000, attached to the platform 1000, or otherwise communicatively coupled with the platform 1000. The driver circuitry 1046 may include individual drivers allowing other components of the platform 1000 to interact with or control various input/output (I/O) devices that may be present within, or connected to, the platform 1000. For example, driver circuitry 1046 may include a display driver to control and allow access to a display device, a touchscreen driver to control and allow access to a touchscreen interface of the platform 1000, sensor drivers to obtain sensor readings of sensor circuitry 1021 and control and allow access to sensor circuitry 1021, EMC drivers to obtain actuator positions of the EMCs 1022 and/or control and allow access to the EMCs 1022, a camera driver to control and allow access to an embedded image capture device, audio drivers to control and allow access to one or more audio devices.

The power management integrated circuitry (PMIC) 1025 (also referred to as "power management circuitry 1025") may manage power provided to various components of the platform 1000. In particular, with respect to the baseband circuitry 1010, the PMIC 1025 may control power-source selection, voltage scaling, battery charging, or DC-to-DC conversion. The PMIC 1025 may often be included when the platform 1000 is capable of being powered by a battery 1030, for example, when the device is included in a UE 901.

In some embodiments, the PMIC 1025 may control, or otherwise be part of, various power saving mechanisms of the platform 1000. For example, if the platform 1000 is in an RRC_Connected state, where it is still connected to the RAN node as it expects to receive traffic shortly, then it may enter a state known as Discontinuous Reception Mode (DRX) after a period of inactivity. During this state, the platform 1000 may power down for brief intervals of time and thus save power. If there is no data traffic activity for an extended period of time, then the platform 1000 may transition off to an RRC_Idle state, where it disconnects from the network and does not perform operations such as channel quality feedback, handover, etc. The platform 1000 goes into a very low power state and it performs paging where again it periodically wakes up to listen to the network and then powers down again. The platform 1000 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1030 may power the platform 1000, although in some examples the platform 1000 may be mounted deployed in a fixed location, and may have a power supply coupled to an electrical grid. The battery 1030 may be a lithium ion battery, a metal-air battery, such as a zinc-air battery, an aluminum-air battery, a lithium-air battery, and the like. In some implementations, such as in V2X applications, the battery 1030 may be a typical lead-acid automotive battery.

In some implementations, the battery 1030 may be a "smart battery," which includes or is coupled with a Battery Management System (BMS) or battery monitoring integrated circuitry. The BMS may be included in the platform 1000 to track the state of charge (SoCh) of the battery 1030. The BMS may be used to monitor other parameters of the battery 1030 to provide failure predictions, such as the state of health (SoH) and the state of function (SoF) of the battery 1030. The BMS may communicate the information of the battery 1030 to the application circuitry 1005 or other components of the platform 1000. The BMS may also include an analog-to-digital (ADC) convertor that allows the application circuitry 1005 to directly monitor the voltage of the battery 1030 or the current flow from the battery 1030.

The battery parameters may be used to determine actions that the platform 1000 may perform, such as transmission frequency, network operation, sensing frequency, and the like.

A power block, or other power supply coupled to an electrical grid may be coupled with the BMS to charge the battery 1030. In some examples, the power block 1030 may be replaced with a wireless power receiver to obtain the power wirelessly, for example, through a loop antenna in the computer platform 1000. In these examples, a wireless battery charging circuit may be included in the BMS. The specific charging circuits chosen may depend on the size of the battery 1030, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1050 includes various input/output (I/O) devices present within, or connected to, the platform 1000, and includes one or more user interfaces designed to enable user interaction with the platform 1000 and/or peripheral component interfaces designed to enable peripheral component interaction with the platform 1000. The user interface circuitry 1050 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 1000. The output device circuitry may also include speakers or other audio emitting devices, printer(s), and/or the like. In some embodiments, the sensor circuitry 1021 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1000 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 11:
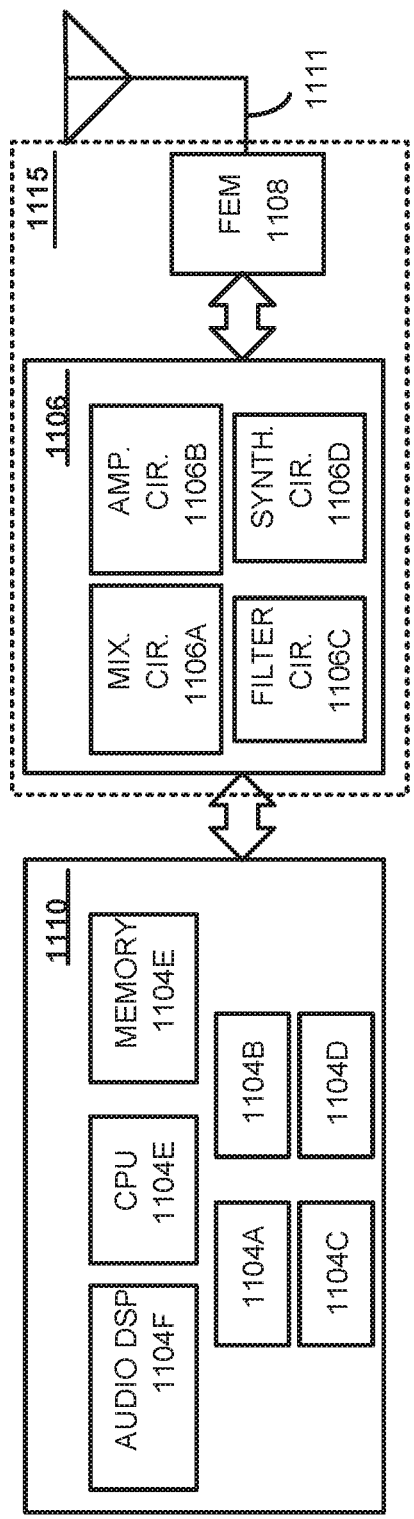
FIG. 11 illustrates example components of baseband circuitry and radio front end modules (RFEM) in accordance with an example.

FIG. 11 illustrates example components of baseband circuitry 1110 and radio front end modules (RFEM) 1115 in accordance with various embodiments. The baseband circuitry 1110 corresponds to the baseband circuitry 1010 of FIG. 10. The RFEM 1115 corresponds to the RFEM 1015 of FIG. 10. As shown, the RFEMs 1115 may include Radio Frequency (RF) circuitry 1106, front-end module (FEM) circuitry 1108, antenna array 1111 coupled together at least as shown.

The baseband circuitry 1110 includes circuitry and/or control logic configured to carry out various radio/network protocol and radio control functions that enable communication with one or more radio networks via the RF circuitry 1106. The radio control functions may include, but are not limited to, signal modulation/demodulation, encoding/decoding, radio frequency shifting, etc. In some embodiments, modulation/demodulation circuitry of the baseband circuitry 1110 may include Fast-Fourier Transform (FFT), precoding, or constellation mapping/demapping functionality. In some embodiments, encoding/decoding circuitry of the baseband circuitry 1110 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 1110 is configured to process baseband signals received from a receive signal path of the RF circuitry 1106 and to generate baseband signals for a transmit signal path of the RF circuitry 1106. The baseband circuitry 1110 is configured to interface with application circuitry 1005 (see FIG. 10) for generation and processing of the baseband signals and for controlling operations of the RF circuitry 1106. The baseband circuitry 1110 may handle various radio control functions.

The aforementioned circuitry and/or control logic of the baseband circuitry 1110 may include one or more single or multi-core processors. For example, the one or more processors may include a 3G baseband processor 1104A, a 4G/LTE baseband processor 1104B, a 5G/NR baseband processor 1104C, or some other baseband processor(s) 1104D for other existing generations, generations in development or to be developed in the future (e.g., sixth generation (6G), etc.). In other embodiments, some or all of the functionality of baseband processors 1104A-D may be included in modules stored in the memory 1104G and executed via a Central Processing Unit (CPU) 1104E. In other embodiments, some or all of the functionality of baseband processors 1104A-D may be provided as hardware accelerators (e.g., FPGAs, ASICs, etc.) loaded with the appropriate bit streams or logic blocks stored in respective memory cells. In various embodiments, the memory 1104G may store program code of a real-time OS (RTOS), which when executed by the CPU 1104E (or other baseband processor), is to cause the CPU 1104E (or other baseband processor) to manage resources of the baseband circuitry 1110, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 1110 includes one or more audio digital signal processor(s) (DSP) 1104F. The audio DSP(s) 1104F include elements for compression/decompression and echo cancellation and may include other suitable processing elements in other embodiments.

In some embodiments, each of the processors 1104A-1104E include respective memory interfaces to send/receive data to/from the memory 1104G. The baseband circuitry 1110 may further include one or more interfaces to communicatively couple to other circuitries/devices, such as an interface to send/receive data to/from memory external to the baseband circuitry 1110; an application circuitry interface to send/receive data to/from the application circuitry 1005 of FIGS. 10-11); an RF circuitry interface to send/receive data to/from RF circuitry 1106 of FIG. 11; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 1025.

In alternate embodiments (which may be combined with the above described embodiments), baseband circuitry 1110 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1110 may include protocol processing circuitry with one or more instances of control circuitry (not shown) to provide control functions for the digital baseband circuitry and/or radio frequency circuitry (e.g., the radio front end modules 1115).

Although not shown by FIG. 11, in some embodiments, the baseband circuitry 1110 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 1110 and/or RF circuitry 1106 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 1110 and/or RF circuitry 1106 are part of a Wi-Fi communication system. In the second example, the protocol processing circuitry would operate Wi-Fi MAC and logical link control (LLC) functions. The protocol processing circuitry may include one or more memory structures (e.g., 1104G) to store program code and data for operating the protocol functions, as well as one or more processing cores to execute the program code and perform various operations using the data. The baseband circuitry 1110 may also support radio communications for more than one wireless protocol.

The various hardware elements of the baseband circuitry 1110 discussed herein may be implemented, for example, as a solder-down substrate including one or more integrated circuits (ICs), a single packaged IC soldered to a main circuit board or a multi-chip module containing two or more ICs. In one example, the components of the baseband circuitry 1110 may be suitably combined in a single chip or chipset, or disposed on a same circuit board. In another example, some or all of the constituent components of the baseband circuitry 1110 and RF circuitry 1106 may be implemented together such as, for example, a system on a chip (SoC) or System-in-Package (SiP). In another example, some or all of the constituent components of the baseband circuitry 1110 may be implemented as a separate SoC that is communicatively coupled with and RF circuitry 1106 (or multiple instances of RF circuitry 1106). In yet another example, some or all of the constituent components of the baseband circuitry 1110 and the application circuitry 1005 may be implemented together as individual SoCs mounted to a same circuit board (e.g., a "multi-chip package").

In some embodiments, the baseband circuitry 1110 may provide for communication compatible with one or more radio technologies. For example, in some embodiments, the baseband circuitry 1110 may support communication with an E-UTRAN or other WMAN, a WLAN, a WPAN. Embodiments in which the baseband circuitry 1110 is configured to support radio communications of more than one wireless protocol may be referred to as multi-mode baseband circuitry.

RF circuitry 1106 may enable communication with wireless networks using modulated electromagnetic radiation through a non-solid medium. In various embodiments, the RF circuitry 1106 may include switches, filters, amplifiers, etc. to facilitate the communication with the wireless network. RF circuitry 1106 may include a receive signal path, which may include circuitry to down-convert RF signals received from the FEM circuitry 1108 and provide baseband signals to the baseband circuitry 1110. RF circuitry 1106 may also include a transmit signal path, which may include circuitry to up-convert baseband signals provided by the baseband circuitry 1110 and provide RF output signals to the FEM circuitry 1108 for transmission.

In some embodiments, the receive signal path of the RF circuitry 1106 may include mixer circuitry 1106a, amplifier circuitry 1106b and filter circuitry 1106c. In some embodiments, the transmit signal path of the RF circuitry 1106 may include filter circuitry 1106c and mixer circuitry 1106a. RF circuitry 1106 may also include synthesizer circuitry 1106d for synthesizing a frequency for use by the mixer circuitry 1106a of the receive signal path and the transmit signal path. In some embodiments, the mixer circuitry 1106a of the receive signal path may be configured to down-convert RF signals received from the FEM circuitry 1108 based on the synthesized frequency provided by synthesizer circuitry 1106d. The amplifier circuitry 1106b may be configured to amplify the down-converted signals and the filter circuitry 1106c may be a low-pass filter (LPF) or band-pass filter (BPF) configured to remove unwanted signals from the down-converted signals to generate output baseband signals. Output baseband signals may be provided to the baseband circuitry 1110 for further processing. In some embodiments, the output baseband signals may be zero-frequency baseband signals, although this is not a requirement. In some embodiments, mixer circuitry 1106a of the receive signal path may comprise passive mixers, although the scope of the embodiments is not limited in this respect.

In some embodiments, the mixer circuitry 1106a of the transmit signal path may be configured to up-convert input baseband signals based on the synthesized frequency provided by the synthesizer circuitry 1106d to generate RF output signals for the FEM circuitry 1108. The baseband signals may be provided by the baseband circuitry 1110 and may be filtered by filter circuitry 1106c.

In some embodiments, the mixer circuitry 1106a of the receive signal path and the mixer circuitry 1106a of the transmit signal path may include two or more mixers and may be arranged for quadrature downconversion and upconversion, respectively. In some embodiments, the mixer circuitry 1106a of the receive signal path and the mixer circuitry 1106a of the transmit signal path may include two or more mixers and may be arranged for image rejection (e.g., Hartley image rejection). In some embodiments, the mixer circuitry 1106a of the receive signal path and the mixer circuitry 1106a of the transmit signal path may be arranged for direct downconversion and direct upconversion, respectively. In some embodiments, the mixer circuitry 1106a of the receive signal path and the mixer circuitry 1106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1110 may include a digital baseband interface to communicate with the RF circuitry 1106.

In some dual-mode embodiments, a separate radio IC circuitry may be provided for processing signals for each spectrum, although the scope of the embodiments is not limited in this respect.

In some embodiments, the synthesizer circuitry 1106d may be a fractional-N synthesizer or a fractional N/N+1 synthesizer, although the scope of the embodiments is not limited in this respect as other types of frequency synthesizers may be suitable. For example, synthesizer circuitry 1106d may be a delta-sigma synthesizer, a frequency multiplier, or a synthesizer comprising a phase-locked loop with a frequency divider.

The synthesizer circuitry 1106d may be configured to synthesize an output frequency for use by the mixer circuitry 1106a of the RF circuitry 1106 based on a frequency input and a divider control input. In some embodiments, the synthesizer circuitry 1106d may be a fractional N/N+1 synthesizer.

In some embodiments, frequency input may be provided by a voltage controlled oscillator (VCO), although that is not a requirement. Divider control input may be provided by either the baseband circuitry 1110 or the application circuitry 1005 depending on the desired output frequency. In some embodiments, a divider control input (e.g., N) may be determined from a look-up table based on a channel indicated by the application circuitry 1005.

Synthesizer circuitry 1106d of the RF circuitry 1106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1106 may include an IQ/polar converter.

FEM circuitry 1108 may include a receive signal path, which may include circuitry configured to operate on RF signals received from antenna array 1111, amplify the received signals and provide the amplified versions of the received signals to the RF circuitry 1106 for further processing. FEM circuitry 1108 may also include a transmit signal path, which may include circuitry configured to amplify signals for transmission provided by the RF circuitry 1106 for transmission by one or more of antenna elements of antenna array 1111. In various embodiments, the amplification through the transmit or receive signal paths may be done solely in the RF circuitry 1106, solely in the FEM circuitry 1108, or in both the RF circuitry 1106 and the FEM circuitry 1108.

In some embodiments, the FEM circuitry 1108 may include a TX/RX switch to switch between transmit mode and receive mode operation. The FEM circuitry 1108 may include a receive signal path and a transmit signal path. The receive signal path of the FEM circuitry 1108 may include an LNA to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission by one or more antenna elements of the antenna array 1111.

The antenna array 1111 comprises one or more antenna elements, each of which is configured convert electrical signals into radio waves to travel through the air and to convert received radio waves into electrical signals. For example, digital baseband signals provided by the baseband circuitry 1110 is converted into analog RF signals (e.g., modulated waveform) that will be amplified and transmitted via the antenna elements of the antenna array 1111 including one or more antenna elements (not shown). The antenna elements may be omnidirectional, direction, or a combination thereof. The antenna elements may be formed in a multitude of arranges as are known and/or discussed herein. The antenna array 1111 may comprise microstrip antennas or printed antennas that are fabricated on the surface of one or more printed circuit boards. The antenna array 1111 may be formed in as a patch of metal foil (e.g., a patch antenna) in a variety of shapes, and may be coupled with the RF circuitry 1106 and/or FEM circuitry 1108 using metal transmission lines or the like.

Processors of the application circuitry 1005 and processors of the baseband circuitry 1110 may be used to execute elements of one or more instances of a protocol stack. For example, processors of the baseband circuitry 1110, alone or in combination, may be used execute Layer 3, Layer 2, or Layer 1 functionality, while processors of the application circuitry 1005 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 12:
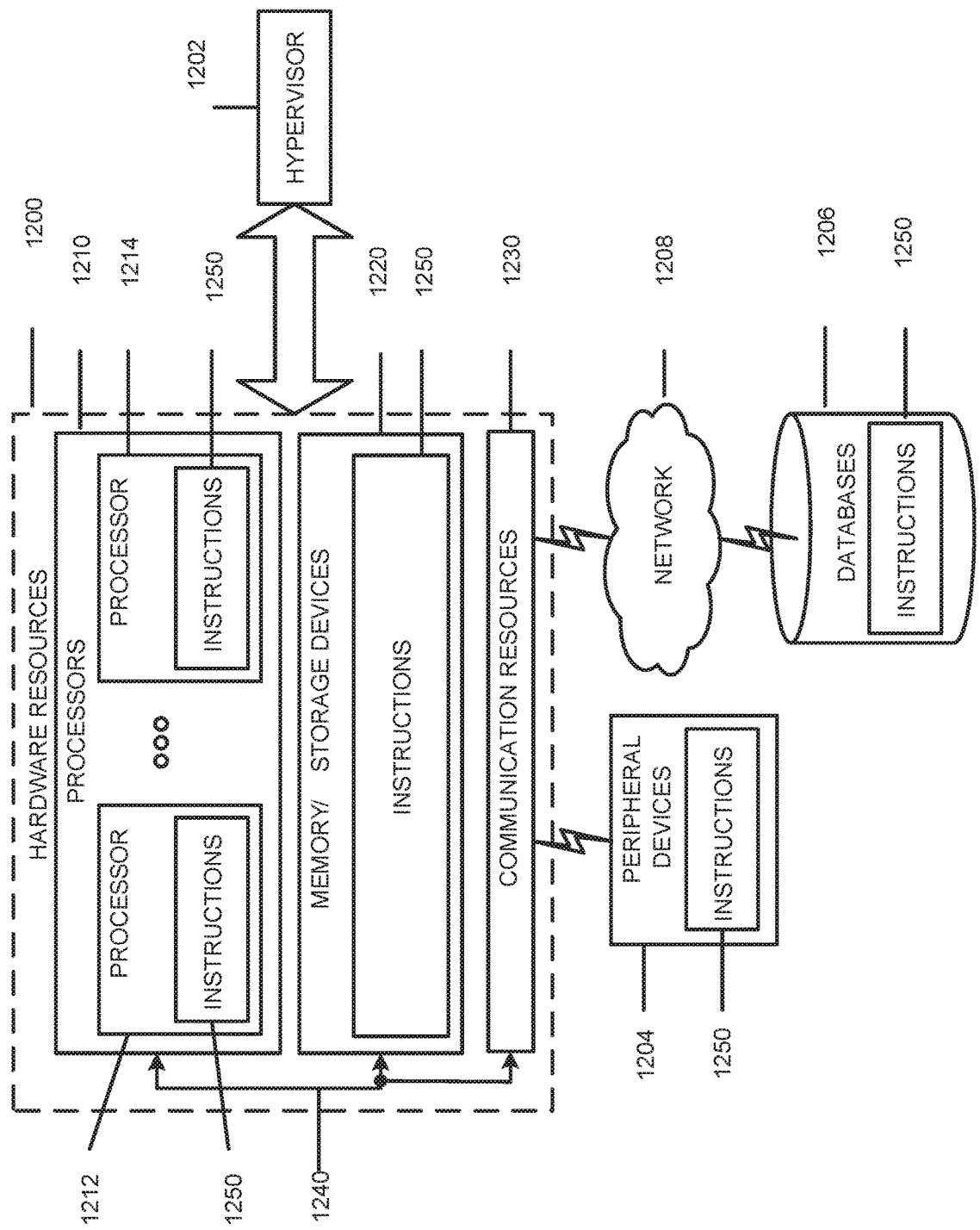
FIG. 12 is a block diagram illustrating components able to read instructions from a machine-readable or computer-readable medium in accordance with an example.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., NFV) is utilized, a hypervisor 1202 may be executed to provide an execution environment for one or more network slices/sub-slices to utilize the hardware resources 1200.

The processors 1210 may include, for example, a processor 1212 and a processor 1214. The processor(s) 1210 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1220 may include main memory, disk storage, or any suitable combination thereof. The memory/storage devices 1220 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via USB), cellular communication components, NFC components, Bluetooth® (or Bluetooth® Low Energy) components, Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

Figure 13:
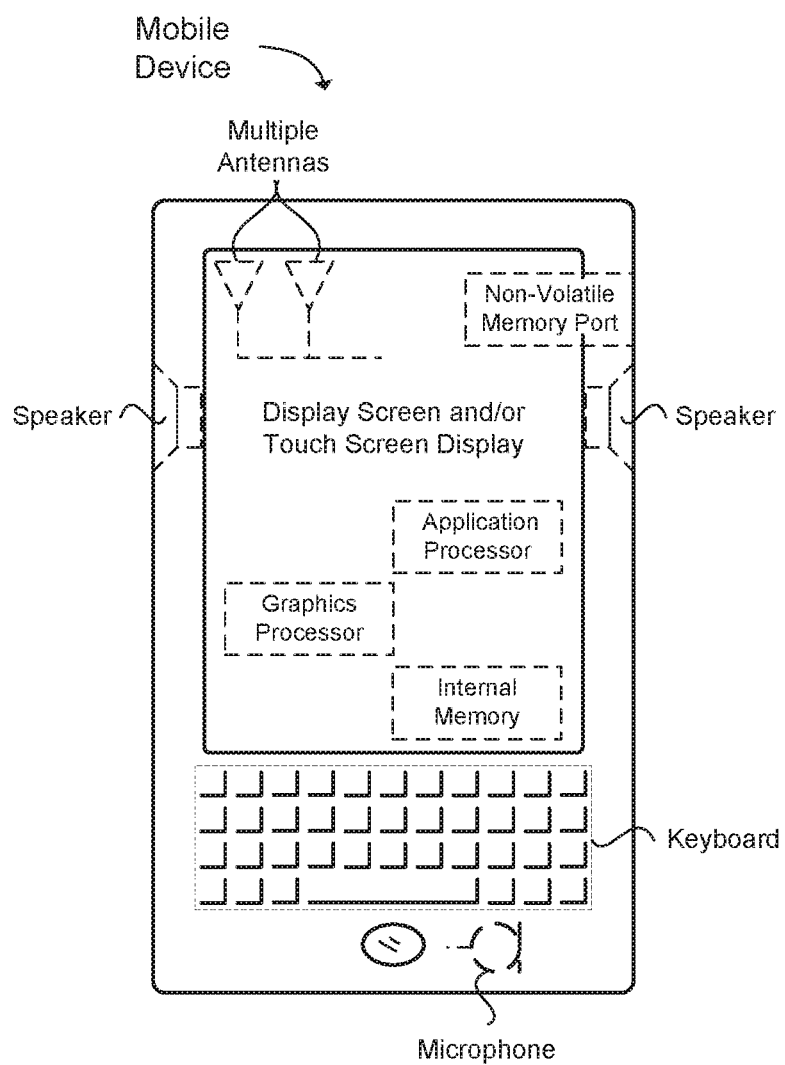
FIG. 13 illustrates a diagram of a wireless device (e.g., UE) in accordance with an example.

FIG. 13 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 13 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

The following examples pertain to specific technology embodiments and point out specific features, elements, or actions that can be used or otherwise combined in achieving such embodiments.

Example 1 includes an apparatus of a user equipment (UE) operable for configured grant uplink (UL) transmission in new radio unlicensed (NR-U), the apparatus comprising: one or more processors configured to: select, at the UE, a hybrid automatic repeat request process identifier (HARQ process ID) from a set of HARQ IDs; insert the HARQ process ID into uplink control information (UCI) on a physical uplink shared channel (PUSCH); and encode, at the UE, the UCI for transmission to a next generation node B (gNB) via a configured grant uplink transmission using the HARQ process ID; and a memory interface configured to send the HARQ process ID to a memory.

Example 2 includes the apparatus of Example 1, wherein the one or more processors are further configured to: retransmit the PUSCH comprising the UCI, at the UE for transmission to the gNB, via the configured grant UL transmission or a scheduled transmission when the UE receives negative acknowledgment (NACK) feedback from the gNB or a timer for the configured grant UL transmission expires.

Example 3 includes the apparatus of Example 1, wherein the one or more processors are further configured to: decode, at the UE, the set of HARQ IDs received from the gNB via radio resource control (RRC) signaling, wherein the set of HARQ IDs enables the configured grant UL transmission at the UE.

Example 4 includes the apparatus of Example 3, wherein the one or more processors are further configured to: decode, at the UE, a bitmap indicating the set of HARQ IDs.

Example 5 includes the apparatus of Example 1, wherein the one or more processors are further configured to: decode, at the UE, a bitmap indicating time-domain resources for configured grant UL transmission, wherein the bitmap is received from the gNB via radio resource control (RRC) signaling, and wherein the bitmap includes a periodicity indicating repetition of the time-domain resources.

Example 6 includes the apparatus of Example 1, wherein the one or more processors are further configured to: identify, at the UE, starting symbols within a slot for the configured grant UL transmission.

Example 7 includes the apparatus of Example 1, wherein the one or more processors are further configured to: identify, at the UE, a gap in time between configured grant UL resources and non-configured grant UL resources.

Example 8 includes the apparatus of Example 1, wherein the one or more processors are further configured to: identify, at the UE, time domain resources configured by the gNB, wherein time domain resources that overlap with time domain resources configured by a discovery reference signal (DRS) transmission are not enabled for configured grant UL transmission.

Example 9 includes an apparatus of a next generation node B (gNB) operable for configured grant uplink (UL) transmission in new radio unlicensed (NR-U), the apparatus comprising: one or more processors configured to: encode, at the gNB, a set of HARQ IDs for transmission to a user equipment (UE) via radio resource control (RRC) signaling, wherein the set of HARQ IDs enables configured grant UL transmission at the UE; decode, at the gNB, a configured grant UL transmission received from the UE; identify, at the gNB, a HARQ process ID carried in an uplink control information (UCI) on a physical uplink shared channel (PUSCH) within the configured grant UL transmission; and a memory interface configured to send the HARQ process ID to a memory.

Example 10 includes the apparatus of Example 9, wherein the one or more processors are further configured to: decode, at the gNB, a UCI carried within a PUSCH retransmitted from the UE via configured grant UL transmission or scheduled transmission when the UE receives negative acknowledgment (NACK) feedback from the gNB or a timer for the configured grant UL transmission expires.

Example 11 includes the apparatus of Example 9, wherein the one or more processors are further configured to: encode, at the gNB, a bitmap indicating time-domain resources for configured grant UL transmission via radio resource control (RRC) signaling, and wherein the bitmap includes a periodicity indicating repetition of the time-domain resources.

Example 12 includes the apparatus of Example 9, wherein the one or more processors are further configured to: encode, at the gNB, time domain resources, wherein time domain resources that overlap with time domain resources configured by a discovery reference signal (DRS) transmission are not encoded.

Example 13 includes at least one non-transitory machine readable storage medium having instructions embodied thereon for autonomous uplink (UL) transmission in new radio unlicensed (NR-U), the instructions when executed by one or more processors at a user equipment (UE) perform the following: selecting, at the UE, a hybrid automatic repeat request process identifier (HARQ process ID) from a set of HARQ IDs; inserting the HARQ process ID into uplink control information (UCI) on a physical uplink shared channel (PUSCH); and encoding, at the UE, the UCI for transmission to a next generation node B (gNB) via a configured grant uplink transmission using the HARQ process ID.

Example 14 includes the at least one non-transitory machine readable storage medium of Example 13, further comprising instructions that when executed perform: retransmitting the PUSCH comprising the UCI, at the UE for transmission to the gNB, via the configured grant UL transmission or a scheduled transmission when the UE receives negative acknowledgment (NACK) feedback from the gNB or a timer for the configured grant UL transmission expires.

Example 15 includes the at least one non-transitory machine readable storage medium of Example 13, further comprising instructions that when executed perform: decoding, at the UE, the set of HARQ IDs received from the gNB via radio resource control (RRC) signaling, wherein the set of HARQ IDs enables the configured grant UL transmission at the UE.

Example 16 includes the at least one non-transitory machine readable storage medium of Example 15, further comprising instructions that when executed perform: decoding, at the UE, a bitmap indicating the set of HARQ IDs.

Example 17 includes the at least one non-transitory machine readable storage medium of Example 13, further comprising instructions that when executed perform: decoding, at the UE, a bitmap indicating time-domain resources for configured grant UL transmission, wherein the bitmap is received from the gNB via radio resource control (RRC) signaling, and wherein the bitmap includes a periodicity indicating repetition of the time-domain resources.

Example 18 includes the at least one non-transitory machine readable storage medium of Example 13, further comprising instructions that when executed perform: identifying, at the UE, starting symbols within a slot for the configured grant UL transmission.

Example 19 includes the at least one non-transitory machine readable storage medium of Example 13, further comprising instructions that when executed perform: identifying, at the UE, a gap in time between configured grant UL resources and non-configured grant UL resources.

Example 20 includes the at least one non-transitory machine readable storage medium of Example 13, further comprising instructions that when executed perform: identifying, at the UE, time domain resources configured by the gNB, wherein time domain resources that overlap with time domain resources configured by a discovery reference signal (DRS) transmission are not enabled for configured grant UL transmission.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) operable for configured grant uplink (UL) transmission in new radio unlicensed (NR-U), the apparatus comprising:
one or more processors configured to:
select, at the UE, a hybrid automatic repeat request process identifier (HARQ process ID) from a set of HARQ process IDs received from a base station;
insert the HARQ process ID into uplink control information (UCI) on a physical uplink shared channel (PUSCH);
encode, at the UE, the UCI for transmission to the base station via a configured grant uplink transmission using the HARQ process ID;
identify, at the UE, a gap in time between configured grant UL resources associated with the configured grant UL transmission and non-configured grant UL resources; and
decode, at the UE, a bitmap indicating time domain resources for the configured grant UL transmission, wherein the bitmap is received from the base station, and wherein the bitmap includes a periodicity indicating repetition of the time domain resources; and
a memory interface configured to send the HARQ process ID to a memory.

2. The apparatus of claim 1, wherein the one or more processors are further configured to retransmit the PUSCH comprising the UCI on a retransmission configured grant transmission when the UE receives negative acknowledgment (NACK) feedback from the base station or a timer for the configured grant UL transmission expires.

3. The apparatus of claim 1, wherein the one or more processors are further configured to decode, at the UE, the set of HARQ process IDs received from the base station via radio resource control (RRC) signaling, wherein the set of HARQ process IDs enables the configured grant UL transmission at the UE.

4. The apparatus of claim 3, wherein the one or more processors are further configured to decode, at the UE, a bitmap indicating the set of HARQ process IDs.

5. The apparatus of claim 1, wherein the one or more processors are further configured to identify, at the UE, starting symbols within a slot for the configured grant UL transmission.

6. The apparatus of claim 1, wherein the one or more processors are further configured to identify, at the UE, first time domain resources for the configured grant UL transmission configured by the base station, wherein the first time domain resources do not overlap with second time domain resources configured by a discovery reference signal (DRS).

7. At least one non-transitory machine readable storage medium having instructions embodied thereon for autonomous uplink (UL) transmission in new radio unlicensed (NR-U), the instructions when executed by one or more processors at a user equipment (UE) perform the following:
selecting, at the UE, a hybrid automatic repeat request process identifier (HARQ process ID) from a set of HARQ process IDs received from a base station;
inserting the HARQ process ID into uplink control information (UCI) on a physical uplink shared channel (PUSCH); and
encoding, at the UE, the UCI for transmission to the base station via a configured grant UL transmission using the HARQ process ID;
identify, at the UE, a gap in time between configured grant uplink resources associated with the configured grant UL transmission and non-configured grant UL resources; and
decoding, at the UE, a bitmap indicating time domain resources for the configured grant UL transmission, wherein the bitmap is received from the base station, and wherein the bitmap includes a periodicity indicating repetition of the time domain resources.

8. The at least one non-transitory machine readable storage medium of claim 7, further comprising instructions that when executed perform retransmitting the PUSCH comprising the UCI on a retransmission configured grant transmission when the UE receives negative acknowledgment (NACK) feedback from the base station or a timer for the configured grant UL transmission expires.

9. The at least one non-transitory machine readable storage medium of claim 7, further comprising instructions that when executed perform decoding, at the UE, the set of HARQ process IDs received from the base station via radio resource control (RRC) signaling, wherein the set of HARQ process IDs enables the configured grant UL transmission at the UE.

10. The at least one non-transitory machine readable storage medium of claim 9, further comprising instructions that when executed perform decoding, at the UE, a bitmap indicating the set of HARQ process IDs.

11. The at least one non-transitory machine readable storage medium of claim 7, further comprising instructions that when executed perform identifying, at the UE, starting symbols within a slot for the configured grant UL transmission.

12. The at least one non-transitory machine readable storage medium of claim 7, further comprising instructions that when executed perform identifying, at the UE, first time domain resources for the configured grant UL transmission configured by the base station, wherein the first time domain resources do not overlap with second time domain resources configured by a discovery reference signal (DRS).

* * * * *